US 12,037,272 B2

(12) United States Patent
You et al.

(10) Patent No.: US 12,037,272 B2
(45) Date of Patent: Jul. 16, 2024

(54) WATER DISPENSING APPARATUS AND CONTROL METHOD THEREFOR

(71) Applicant: LG Electronics Inc., Seoul (KR)

(72) Inventors: Junseok You, Seoul (KR); Kyungsoo Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 503 days.

(21) Appl. No.: 16/834,199

(22) Filed: Mar. 30, 2020

(65) Prior Publication Data
US 2020/0361793 A1    Nov. 19, 2020

(30) Foreign Application Priority Data
May 17, 2019   (KR) .................. 10-2019-0058395

(51) Int. Cl.
*C25B 1/04*    (2021.01)
*C02F 1/461*   (2023.01)
*C02F 1/467*   (2023.01)

(52) U.S. Cl.
CPC .......... *C02F 1/467* (2013.01); *C02F 1/46109* (2013.01); *C02F 2201/005* (2013.01);
(Continued)

(58) Field of Classification Search
CPC .... C25B 1/04; C25B 9/17; C25B 9/00; C25B 15/08; C02F 1/46104; C02F 1/4618;
(Continued)

(56) References Cited

U.S. PATENT DOCUMENTS 6,207,046 B1      3/2001  Yamashita et al.
6,632,347 B1 *   10/2003  Buckley .................. A61P 43/00
                                                         205/345
(Continued)

FOREIGN PATENT DOCUMENTS

JP      H06-226257     8/1994
JP      H09253650      9/1997
(Continued)

OTHER PUBLICATIONS

PCT International Search Report and Written Opinion in International Appln. No. PCT/KR2020/005677, dated Aug. 7, 2020, 13 pages.
(Continued)

*Primary Examiner* — Zulmariam Mendez
(74) *Attorney, Agent, or Firm* — Fish & Richardson P.C.

(57) ABSTRACT

A water dispensing apparatus includes a source water pipe, a sterilizing water module connected to the source water pipe and configured to and generate sterilizing water, a sterilizing water pipe connected to the sterilizing water module and configured to provide the sterilizing water generated by the sterilizing water module to a user, a flow rate sensor disposed at the source water pipe, a power supply configured to apply a voltage to an electrode of the sterilizing water module, a current detector configured to detect a current value output from the electrode of the sterilizing water module based on the voltage being applied to the electrode of the sterilizing water module, and a controller configured to set a target current value of the sterilizing water module based on at least one of flow rate information detected by the flow rate sensor or the current value detected by the current detector.

9 Claims, 14 Drawing Sheets

(52) U.S. Cl.
CPC ............... *C02F 2201/4611* (2013.01); *C02F 2201/4612* (2013.01)

(58) Field of Classification Search
CPC ............ C02F 2201/461; C02F 2209/40; C02F 1/461; C02F 1/467
See application file for complete search history.

(56) References Cited

U.S. PATENT DOCUMENTS

| | | | |
|---|---|---|---|
| 2016/0016827 A1* | 1/2016 | Reiss | C02F 1/4602 210/96.1 |
| 2020/0024160 A1* | 1/2020 | Koizumi | C02F 1/4618 |

FOREIGN PATENT DOCUMENTS

| | | |
|---|---|---|
| KR | 1020090107214 | 10/2009 |
| KR | 10-2011-0001969 | 1/2011 |
| KR | 2014-0033772 | 3/2014 |
| KR | 10-2017-0133196 | 12/2017 |
| KR | 10-2017-0133199 | 12/2017 |
| KR | 101803875 | 12/2017 |
| KR | 101861710 | 5/2018 |

OTHER PUBLICATIONS

Office Action in Korean Appln. No. 10-2019-0058395, mailed on Apr. 25, 2024, 10 pages (with English translation).

\* cited by examiner

FIG. 10

| SOURCE WATER<br>FLOW RATE \ TDS | 50.3ppm<br>MODE 1<br>(0~50ppm) | 102ppm<br>MODE 2<br>(50~100ppm) | 151ppm<br>MODE 3<br>(100~150ppm) | 201ppm<br>MODE 4<br>(150~200ppm) | 300ppm<br>모드5<br>(200~300ppm) |
|---|---|---|---|---|---|
| 0.1 | | | | | |
| 0.2 | LOW FLOW RATE DETECTING SECTION | | | | |
| 0.3 | | | | | |
| 0.4 | 0.409 | 0.634 | 0.768 | 0.922 | 1.144 |
| 0.5 | 0.385 | 0.609 | 0.745 | 0.889 | 1.102 |
| 0.6 | 0.374 | 0.597 | 0.731 | 0.869 | 1.088 |
| 0.7 | 0.365 | 0.587 | 0.715 | 0.856 | 1.076 |
| 0.8 | 0.357 | 0.577 | 0.705 | 0.847 | 1.068 |
| 0.9 | 0.353 | 0.570 | 0.703 | 0.843 | 1.065 |

(UNIT : A)

FIG. 12

| SOURCE WATER / FLOW RATE TDS | TDS25 MODE 1 (0~50ppm) | TDS75 MODE 2 (50~100ppm) | TDS125 MODE 3 (100~150ppm) | TDS175 MODE 4 (150~200ppm) | TDS250 모드5 (200~300ppm) |
|---|---|---|---|---|---|
| 0.1 | | | | | |
| 0.2 | LOW FLOW RATE DETECTING SECTION | | | | |
| 0.3 | | | | | |
| 0.4 | 0.910 | 0.870 | 0.820 | 0.780 | 0.710 |
| 0.5 | 1.110 | 1.0505 | 1.000 | 0.940 | 0.860 |
| 0.6 | 1.240 | 1.180 | 1.120 | 1.060 | 0.970 |
| 0.7 | 1.470 | 1.390 | 1.310 | 1.230 | 1.110 |
| 0.8 | 1.570 | 1.490 | 1.410 | 1.330 | 1.210 |
| 0.9 | 1.600 | 1.600 | 1.520 | 1.440 | 1.320 |

(UNIT : A)

WATER DISPENSING APPARATUS AND CONTROL METHOD THEREFOR

CROSS-REFERENCE TO RELATED APPLICATION

This application claims the benefit of priority to Korean Patent Application No. 10-2019-0058395, filed in the Korean Intellectual Property Office on May 17, 2019, the entire contents of which are incorporated herein by reference.

TECHNICAL FIELD

The present disclosure relates to a water dispensing apparatus capable of generating sterilizing water of constant concentration and a control method therefor.

BACKGROUND

A water dispensing apparatus may supply water to a user and allow the user to dispense water as desired according to the user's operation.

For example, when the user operates a lever or a button, stored water may be dispensed through a nozzle. In some cases, the water dispensing apparatus may include a valve of the nozzle that is configured to be opened to dispense water while the user operates the lever or the button. The user may finish operation of the lever or the button when a desired amount of water is filled in a cup or container.

The water dispensing apparatus may be applied to various fields. For example, the water dispensing apparatus may be applied to a refrigerator and a water purifier. In particular, the water dispensing apparatus provided in the refrigerator and the water purifier may be configured to automatically supply a set amount of water according to the user's operation. In some cases, a water dispensing apparatus may supply purified water, cold water, hot water, and sterilizing water.

In some examples, a water dispensing apparatus may supply purified water and sterilizing water.

The water dispensing apparatus may include a supply device that supplies purified water and sterilizing water generated by purified water generating device and sterilizing water generating device to the outside.

The supply device may include a supply cock for supplying purified or sterilizing water, and a number of operation parts provided in the supply cock may increase with the number of sinks.

In some cases, where the use of sterilizing water increases or the flow rate of the supply water changes rapidly, it may be difficult to provide such water as desired.

In some cases, incoming water may contain dissolved solids, and the amount of total dissolved solids (TDS) may affect generation of sterilizing water.

In some cases, it may be difficult to generate sterilizing water having a constant concentration when the flow rate of supply water changes rapidly. For example, when the concentration of total dissolved solids (TDS) in the incoming water changes, the concentration of sterilizing water may be increased or decreased.

In some cases, it may be difficult to constantly maintain the amount of oxidizing mixture (MO) in the sterilizing water. For example, when the amount of oxidizing mixture in the sterilizing water is not constantly maintained at an appropriate level, the sterilizing power may be lowered due to insufficient concentration of the sterilizing water. In some cases, when the concentration of the sterilizing water is excessively increased, chlorine odor may occur due to excessive concentration of the sterilizing water.

SUMMARY

The present disclosure describes a water dispensing apparatus capable of providing sterilizing water having a constant concentration to a user and a control method therefor.

In addition, the present disclosure describes a water dispensing apparatus capable of detecting a flow rate of incoming water and the concentration of total dissolved solids (TDS) in real time, and correspondingly adjusting a voltage applied to an electrode of a sterilizing water module to provide sterilizing water of constant concentration and a control method therefor.

According to one aspect of the subject matter described in this application, a water dispensing apparatus includes: a source water pipe configured to receive water; a sterilizing water module connected to the source water pipe and configured to receive the water from the source water pipe and generate sterilizing water; a sterilizing water pipe connected to the sterilizing water module and configured to provide the sterilizing water generated by the sterilizing water module to a user; a flow rate sensor disposed at the source water pipe; a power supply configured to apply a voltage to an electrode of the sterilizing water module; a current detector configured to detect a current value output from the electrode of the sterilizing water module based on the voltage being applied to the electrode of the sterilizing water module; and a controller configured to set a target current value of the sterilizing water module based on at least one of flow rate information detected by the flow rate sensor or the current value detected by the current detector.

Implementations according to this aspect may include one or more of the following features. For example, the controller may be configured to increase or decrease the voltage applied to the sterilizing water module to thereby control the current value to the target current value. In some examples, the controller may be configured to: increase the target current value based on an increase of the flow rate; and decrease the target current value based on a decrease of the flow rate.

In some implementations, the controller may be configured to, based on a constant voltage being applied from the power supply to the electrode of the sterilizing water module, set a value detected by the current detector as the target current value. In some examples, the controller may be configured to: predict a hardness of introduced water based on the current value detected by the current detector; decrease the target current value based on the hardness of the introduced water being greater than a reference hardness; and increase the target current value based on the hardness of the introduced water being less than or equal to the reference hardness.

In some implementations, the source water pipe may include a filter configured to purify incoming water and a feed valve configured to control flow of water in the source water pipe. In some implementations, the sterilizing water pipe may include a sterilizing water valve configured to control flow of sterilizing water in the sterilizing water pipe.

In some implementations, the sterilizing water module may include: an inlet tube disposed at a first side of the sterilizing water module and configured to receive water from the source water pipe; a casing that defines an inner space extending parallel to the inlet tube and being configured to guide the water received through the inlet tube; an electrode portion that extends parallel to a longitudinal direction of the casing, that is disposed in the inner space of the casing, and that may be configured to generate sterilizing water through electrolysis of water; and a discharge tube that extends parallel to the inlet tube, that is disposed at a second side of the sterilizing water module opposite to the inlet tube, and that may be configured to discharge water passing through the inner space of the casing.

In some examples, the electrode portion may include a first electrode and a second electrode that faces the first electrode, that is spaced apart from the first electrode, and that extends parallel to the first electrode. In some examples, at least a part of the casing may have an elongated flat box shape, and the inner space corresponding to the part of the casing may define one cross-sectional area along a flow direction of water in the casing.

According to another aspect, a control method for a water dispensing apparatus, which includes a sterilization water module configured to generate sterilizing water through electrolysis of water, includes: receiving a sterilizing water dispensing command from a user; detecting a flow rate of water introduced into the sterilization water module; applying a constant voltage to an electrode of the sterilizing water module; detecting a current value output from the electrode of the sterilizing water module based on applying the constant voltage to the electrode of the sterilizing water module; and setting a target current value of the sterilizing water module based on at least one of the flow rate or the current value.

Implementations according to this aspect may include one or more of the following features. For example, the control method may further include: based on setting the target current value, comparing the current value to the target current value; and based on comparing the current value to the target current value, determining a voltage to be applied to the electrode of the sterilizing water module.

In some implementations, determining the voltage may include: increasing the voltage to be applied to the electrode of the sterilizing water module based on the current value being less than the target current value; and decreasing the voltage to be applied to the electrode of the sterilizing water module based on the current value is greater than the target current value.

In some implementations, setting the target current may include: based on the current value being less than a reference value, determining that a hardness of the water introduced into the sterilization water module is less than or equal to a reference hardness, and increasing the target current value; and based on the current value being greater than the reference value, determining that the hardness of the water introduced into the sterilization water module is greater than the reference hardness, and decreasing the target current value.

In some implementations, setting the target current value may include, based on detecting that the constant voltage is applied to the electrode of the sterilizing water module, setting the current value as the target current value.

In some implementations, setting the target current value may include: increasing the target current value based on an increase of the flow rate; and decreasing the target current value based on a decrease of the flow rate.

According to another aspect, a control method for a water dispensing apparatus, which includes a sterilization water module configured to generate sterilizing water through electrolysis of water, includes: receiving a sterilizing water dispensing command from a user; determining a dispensing amount corresponding to the sterilizing water dispensing command; comparing the dispensing amount to a reference value; detecting a flow rate of water introduced into the sterilization water module based on the dispensing amount being less than the reference value; and setting a target current value of the sterilizing water module based on the flow rate.

Implementations according to this aspect may include one or more of the following features. For example, setting the target current value may include: setting the target current value based on a current value that was output by the sterilizing water module corresponding to a previous sterilizing water dispensing event.

In some implementations, the control method may further include, based on the dispensing amount being greater than the reference value, applying a constant voltage to an electrode of the sterilizing water module and detecting a current value output from the electrode of the sterilizing water module. Setting the target current value may include setting the target current value based on the flow rate and the current value.

In some implementations, the control method may further include: based on setting the target current value, comparing the current value to the target current value; and based on comparing the current value to the target current value, determining a voltage to be applied to the electrode of the sterilizing water module.

In some implementations, the water dispensing apparatus may generate a constant concentration of sterilizing water and provide the sterilizing water to the user. The constant concentration of sterilizing water may not be affected by a change in the flow rate of incoming water and a change in the concentration of the total dissolved solids (TDS) of the incoming water.

In some implementations, the flow rate of incoming water may be detected in real time, when the flow rate is increased, the voltage applied to the electrode of the sterilizing water module is controlled to increase, and when the flow rate is decreased, the voltage applied to the electrode of the sterilizing water module is controlled to decrease, thereby generate sterilizing water of constant concentration and providing the sterilizing water to the user.

In some implementations, the concentration of the total dissolved solids (TDS) of incoming water may be predicted in real time. The voltage applied to the electrode of the sterilizing water module may be controlled to decrease when the concentration of the total dissolved solids (TDS) of the incoming water is increased. The voltage applied to the electrode of the sterilizing water module may be controlled to increase when the concentration of the total dissolved solids (TDS) of the incoming water is decreased. Thus, the user may dispense sterilizing water having a constant concentration even when the concentration of the substance (e.g., TDS) is changed.

In some implementations, the drinking water of selected one from purified water, cold water, hot water, and/or sterilizing water may be discharged from the water dispensing part installed outside the sink, which may enhance user convenience.

In some examples, where the drinking water and sterilizing water are discharged through individual cocks and individual pipes, the user may dispense only drinking water not mixed with a part of sterilizing water.

In some implementations, the drinking water of selected one from purified water, cold water, hot water, and/or sterilizing water having sterilizing power may be discharged from the water dispensing part installed outside the sink, thus allowing the user to perform washing and rinsing operation in one place.

In some implementations, by reducing the volume of the sterilizing water module, it may be possible to save an installation space and allow the sterilizing water module to be simply and additionally installed inside an existing water purifier or water treatment device.

BRIEF DESCRIPTION OF THE DRAWINGS

FIG. 10 is a table showing examples of current values output from the sterilizing water module according to the flow rate and hardness of water flowing into the sterilizing water module when a constant voltage is applied to an electrode of a sterilizing water module.

FIG. 12 is a table showing examples of target current values output from the sterilizing water module by the flow rate and hardness of water flowing into the sterilizing water module.

DETAILED DESCRIPTION

Exemplary implementations of the present disclosure will be described below in detail with reference to the accompanying drawings in which the same reference numbers are used throughout this specification to refer to the same or like parts. In describing the present disclosure, a detailed description of known functions and configurations will be omitted when it may obscure the subject matter of the present disclosure.

Figure 1:
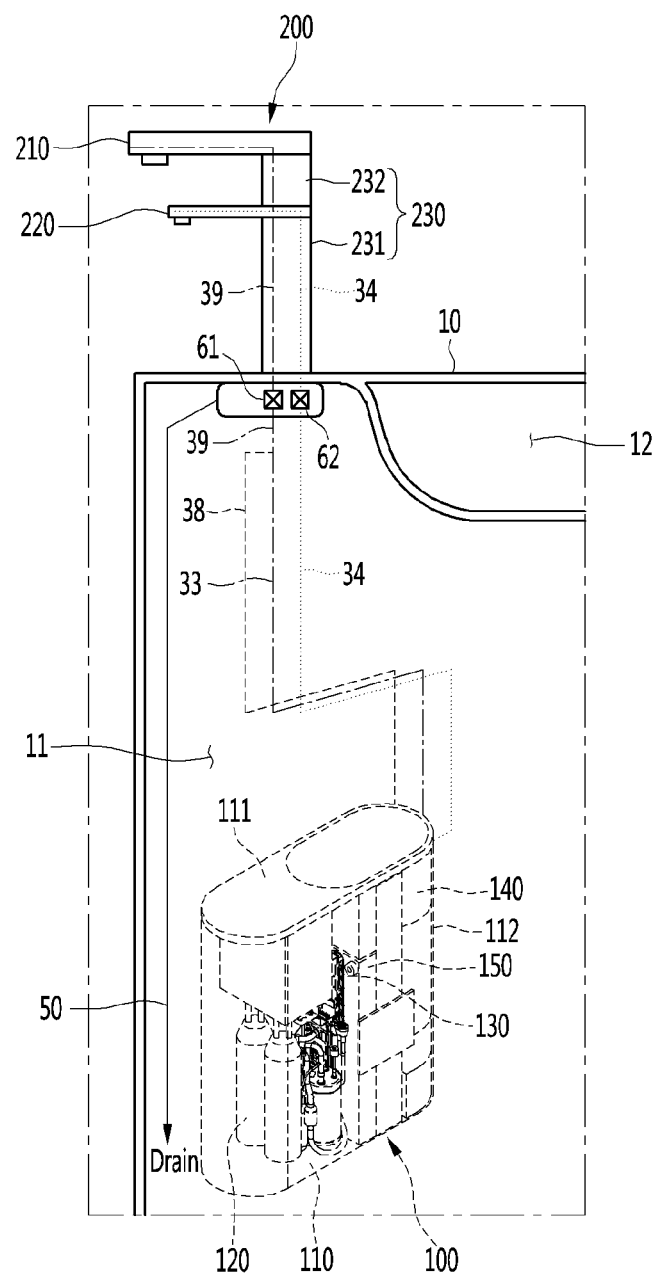
FIG. 1 is a view showing an example of a water dispensing apparatus mounted at a sink.
Figure 2:
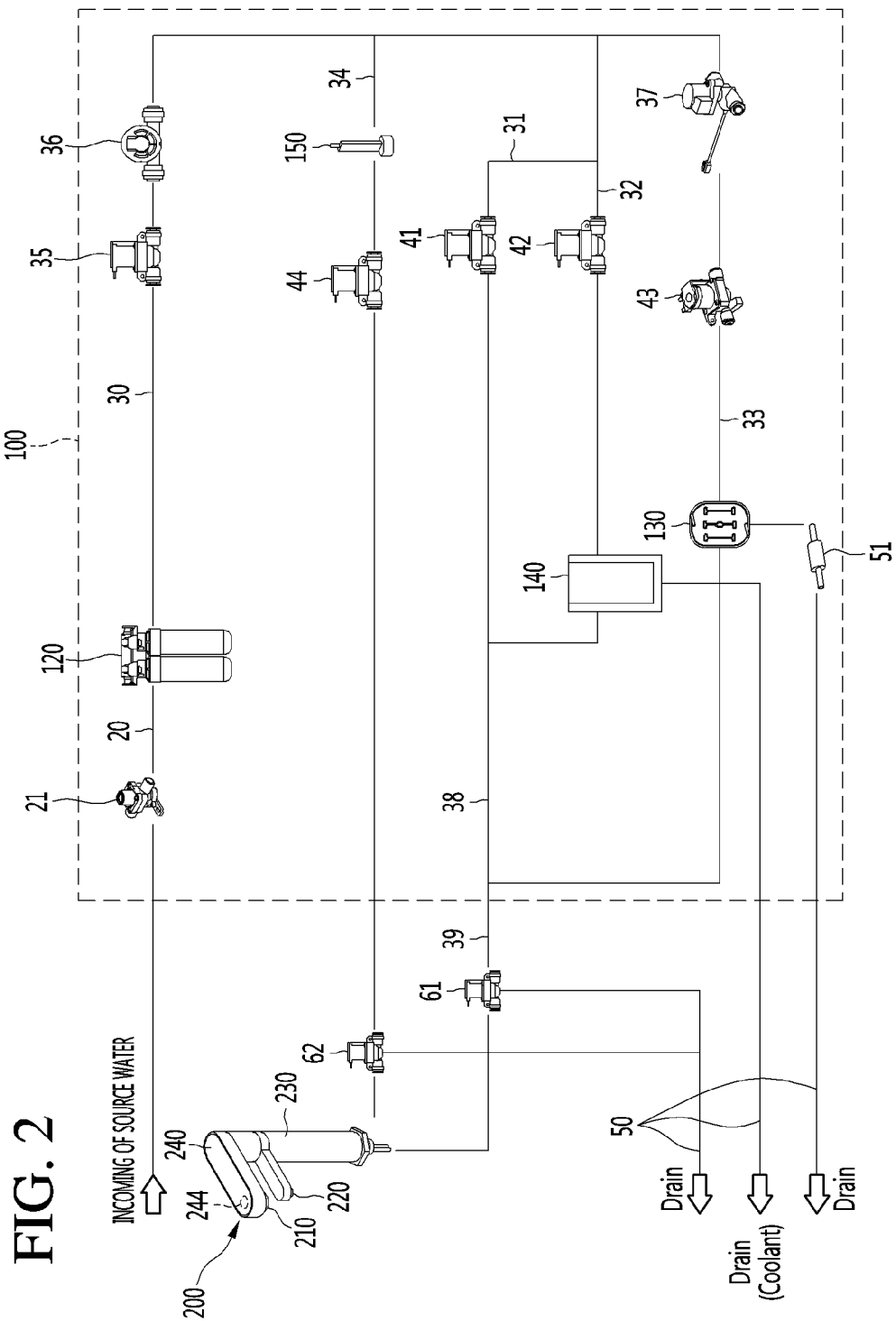
FIG. 2 is a diagram showing an example of configuration of water pipes of a water dispensing apparatus.

FIG. 1 is a view showing an example of a water dispensing apparatus mounted at a sink. In some examples, the water dispensing apparatus may be installed in a space below the sink and may be referred to as an under-sink water purifier. FIG. 2 is a diagram showing an example configuration of water pipes of a water dispensing apparatus.

The water dispensing apparatus may include various water treatment apparatuses and water purifying apparatuses that may introduce water from the outside, purify the introduced water, and then discharge the water. In some cases, the water treatment apparatuses and water purifying apparatuses may be included in a water purifier, a refrigerator, or the like.

For example, a water dispensing apparatus may be an under sink type water purifier including at least a part disposed in a lower space of a sink 10.

Referring to FIGS. 1 to 2, the water dispensing apparatus may include a body portion 100 installed inside the sink 10 and a water dispensing part 200 having at least a part exposed to the outside of the sink 10.

The body portion 100 may include a housing 110 that defines an outer surface. The housing 110 may include a top cover 111 having a planar shape, which defines an upper surface thereof. In some examples, the housing 110 may include a front surface and a rear surface formed convexly, respectively, frontward or rearward. In some examples, both side surfaces connecting the front and the rear and a bottom surface may define a flat surface.

The housing 110 may have a box shape and may be disposed in a storage space 11 provided below the sink 10.

The housing 110 may be provided in a slim shape having a narrow left-right width and a long front-rear length. In some examples, it can be disposed in the left and right or front and rear direction inside the sink. In some examples, it can be disposed in the inner corner of an inner space of the sink in which the space utilization can be improved.

In some implementations, the front surface of the housing 110 may be separated therefrom. When the front surface of the housing 110 is separated, a filter is exposed, the user may easily replace the filter exposed to the outside.

In addition, the water dispensing apparatus may include a source water pipe 20 for guiding source water supplied from the outside of the housing 110 into the housing 110, a filter 120 for purifying water supplied along the source water pipe 20 for purified water, and a water discharge pipe 30 for allowing the purified water passing through the filter 120 to flow into the water dispensing part 200.

In some implementations, the source water pipe 20 may connect an external water supply source and the filter 120 inside the housing 110 while passing through the housing 110. Through the source water pipe 20, source water supplied from the water supply source outside the housing 110 may be supplied to the filter 120.

The water (source water) supplied to the filter 120 as described above is purified for purified water while passing through the filter 120. At least one filter 120 may be provided. For example, three or more filters 120 may be provided. Therefore, the water passing through the source water pipe 20 may be purified for cleaner water while passing through the plurality of filters 120.

The purified water passing through the filter 120 may flow into the water dispensing part 200 exposed to the outside of the sink 10 through the water discharge pipe 30.

In some implementations, one end of the water discharge pipe 30 may be connected to the filter 120, and the other end may pass through the housing 110 and be exposed to the outside of the housing 110 and connected to the water dispensing part 200. In this case, the water discharge pipe 30 may pass through the rear end of the housing 110 (the right side in FIG. 1. In some implementations, the water discharge pipe 30 may include a sterilizing water pipe 34, common pipes 38 and 39, and a hot water pipe 33 to be described later. While the water discharge pipe 30 passes through the rear end of the housing 110 as described above, the water discharge pipe 30 does not pass through the top cover 111 forming the upper surface of the housing 110, and therefore, assembly and separation of the top cover 111 may be easily performed.

In some examples, the sterilizing water may refer to water that is generated through electrolysis of water to have a sterilizing power.

In some implementations, in order for the water discharge pipe 30 to pass through the rear end of the housing 110 as described above, a recess that is concave downward may be defined in the center of the upper end of a rear cover 112 forming the rear surface of the housing 110.

Through the recess, at least one of the water discharge pipe 30, that is, the sterilizing water pipe 34, the common pipes 38 and 39, and the hot water pipe 33 to be described later may escape from the inside of the housing 110 to the outside. In some cases, an open upper side of the recess may be covered by the top cover 111. Accordingly, when the top cover 111 is removed from the housing 110, the upper side of the recess may be opened, and when the top cover 111 is mounted to the housing 110, the upper side of the recess may be covered so that the recess forms a closed space. In addition, the water discharge pipe 30 passing through the recess may be fixed by the recess and the top cover 111.

In addition, the other end of the water discharge pipe 30 exposed to the outside of the housing 110 may be directly connected to the water dispensing part 200 or may be connected to the water dispensing part 200 through a separate connection pipe or a connection portion.

In the latter case, one end of the connection pipe or the connection portion may be connected to the water discharge pipe 30, and the other end thereof may be connected to the water dispensing part 200. In this case, the water discharged to the outside of the housing 110 through the water discharge pipe 30 may be supplied to the water dispensing part 200 through a connection pipe.

As described above, the water discharge pipe 30 may include at least one of a purified water pipe 31, a cold water pipe 32, a hot water pipe 33, and a sterilizing water pipe 34.

That is, in the following description, the purified water pipe 31, the cold water pipe 32, the hot water pipe 33 and the sterilizing water pipe 34 may be understood to be included in the water discharge pipe 30. In addition, it will be understood that the common pipes 38 and 39 described below are also included in the water discharge pipe 30.

In the following description, the water discharge pipe 30 may be understood as including all of the purified water pipe 31, the cold water pipe 32, the hot water pipe 33, the sterilizing water pipe 34 and the common pipes 38 and 39.

One end of the water discharge pipe 30 is connected to the filter 120, the water passing through the filter 120 flows into the water dispensing part 200 through the water discharge pipe 30.

In some examples, the other end of the water discharge pipe 30 may be branched into the purified water pipe 31, the cold water pipe 32, the hot water pipe 33 and the sterilizing water pipe 34 inside the housing 110.

In the water discharge pipe 30, the water branched to the purified water pipe 31 is directly supplied to the water dispensing part 200 in the purified state.

In some implementations, in the water discharge pipe 30, the water branched to the cold water pipe 32 may be cooled while passing through a cold water tank 140 provided on the cold water pipe 32 and supplied to the water dispensing part 200 in the state of cold water.

In addition, the water branched to the hot water pipe 33 is heated while passing through a hot water tank 130 provided on the hot water pipe 33, and is supplied to the water dispensing part 200 in the state of hot water.

In addition, the water branched into the sterilizing water pipe 34 may be sterilized while passing through a sterilizing water module 150 provided on the sterilizing water pipe 34 and be supplied to the water dispensing part 200 in the state of sterilizing water.

In some implementations, a pressure reducing valve 21 for adjusting a flow rate of water supplied to the filter 120 may be installed in the source water pipe 20.

In addition, at least one of a flow rate sensor 36 for detecting a flow rate of water, a feed valve 35 for adjusting a flow rate of water, or regulating the flow of water, or a flow speed sensor for detecting a flow speed of the water may be installed in the source water pipe 20 or the water discharge pipe 30.

In addition, an opening/closing valve for regulating flow of water in a pipe may be installed separately in the purified water pipe 31, the cold water pipe 32, the hot water pipe 33 and the sterilizing water pipe 34, which are branched from the water discharge pipe 30.

In detail, the purified water pipe 31 may be provided with a purified water valve 41 for controlling the flow of water in the purified water pipe 31. In addition, the cold water pipe 32 may be provided with a cold water valve 42 for controlling the flow of water in the cold water pipe 32. In addition, the hot water pipe 33 may be provided with a hot water valve 43 for controlling the flow of water in the hot water pipe 33. In addition, the sterilizing water pipe 34 may be provided with a sterilizing water valve 44 for controlling the flow of water in the sterilizing water pipe 34.

In addition, the hot water pipe 33 may be provided with a flow rate control valve 37 for adjusting the amount of water flowing into the hot water tank 130. In addition, a safety valve 51 for discharging steam may be installed in the hot water tank 130.

In some examples, when the flow rate sensor 36 is provided as described above, the amount of water supplied to the cold water tank 140 and the hot water tank 130 may be detected, and the power supplied to the cold water tank 140 and hot water tank 130 may be adjusted by utilizing the flow rate information.

In addition, when the flow rate control valve 37 is provided, it is possible to adjust the amount of water supplied to the hot water tank 130 to immediately generate hot water of a temperature desired by a user.

Further, when the purified water valve 41, the cold water valve 42, the hot water valve 43, and the sterilizing water valve 44 are provided in the purified water pipe 31, the cold water pipe 32, the hot water pipe 33, and the sterilizing water pipe 34, respectively, the flow of water supplied to the cold water tank 140, the hot water tank 130, and the sterilizing water module 150 may be controlled. In addition, the cold water valve 42, the hot water valve 43, and the sterilizing water valve 44 are opened only when cold water, hot water or sterilizing water is generated, and thus water may be supplied to the cold water tank 140, the hot water tank 130, and the sterilizing water module 150. In the case of the purified water valve 41, the purified water valve 41 is opened only when purified water dispensing is necessary, and the purified water may be supplied to the water dispensing part 200.

The water dispensing part 200 may include a plurality of water discharge nozzles 210 and 220 which supply purified water, cold water, hot water and sterilizing water supplied from the purified water pipe 31, the cold water pipe 32, the hot water pipe 33 and the sterilizing water pipe 34 to the user. The plurality of water discharge nozzles 210 and 220 may extend in a horizontal direction from a body portion 230 extending in the vertical direction to be exposed to the upper side of the sink 10.

The water discharge nozzles 210 and 220 may include a first water discharge nozzle 210 through which purified water, cold water and hot water are discharged, and a second water discharge nozzle 220 through which sterilizing water is discharged.

As an example, the first water discharge nozzle 210 and the second water discharge nozzle 220 may be spaced apart from each other in the vertical direction. In this case, the first water discharge nozzle 210 may be disposed on the upper side and the second water discharge nozzle 220 may be disposed on the lower side.

Therefore, it is possible to prevent a problem that the first water discharge nozzle 210 is contaminated by the sterilizing water when the sterilizing water discharged from the second water discharge nozzle 220 falls on the first water discharge nozzle 210 through which purified water, cold water, and hot water are discharged. In addition, the first water discharge nozzle 210 through which cold, hot or purified water is discharged and which is relatively frequently used is disposed on the upper side, thus achieving easy access of the user and making manipulation and water discharge easy. In addition, the second water discharge nozzle 220 which is used relatively less is disposed under the first water discharge nozzle 210 and may be hidden so that it is difficult to access the second water discharge nozzle 220 compared to the first water discharge nozzle 210 to prevent the sterilizing water from being dispensed accidentally and from being drunk.

As another example, the first water discharge nozzle 210 and the second water discharge nozzle 220 may be spaced apart from each other in the horizontal direction.

The first water discharge nozzle 210 and the second water discharge nozzle 220 may be mounted rotatably around the body portion 230. The first water discharge nozzle 210 and the second water discharge nozzle 220 may be independently rotated.

In some implementations, the purified water and the cold water flowing along the purified water pipe 31 and the cold water pipe 32 may be joined at one first common pipe 38 and may be supplied to the water dispensing part 200 through the first common pipe 38. Therefore, purified water, cold water, and hot water flowing through the first common pipe 38 and the hot water pipe 33 may be supplied to the user through the first water discharge nozzle 210.

In some examples, the hot water pipe 33 may also be joined to the first common pipe 38. The second common pipe 39 may be connected to the water dispensing part 200 from a point where the hot water pipe 33 and the first common pipe 38 are joined. In this case, purified water, cold water, and hot water flowing through the second common pipe 39 may be supplied to the user through the first water discharge nozzle 210.

In some examples, the sterilizing water generated by the sterilizing water module 150 may be supplied to the user outside the sink 10 through the second water discharge nozzle 220 after flowing through the sterilizing water pipe 34.

The second water discharge valve 62 may be installed on the sterilizing water pipe 34. The second water discharge valve 62 may be installed between the sterilizing water pipe 34 and the water dispensing part 200.

The second water discharge valve 62 may supply sterilizing water flowing into the water dispensing part 200 through the sterilizing water pipe 34 to the water dispensing part 200, or discharge the sterilizing water to a separate drain pipe 50.

In addition, a first water discharge valve 61 may be installed on the second common pipe 39. The first water discharge valve 61 may be installed between the second common pipe 39 and the water dispensing part 200.

The first water discharge valve 61 may supply purified water, cold water, and hot water flowing into the water dispensing part 200 through the second common pipe 39 to the water dispensing part 200, or discharge the purified water, cold water, and hot water to a separate drain pipe 50.

For example, each of the first water discharge valve 61 and the second water discharge valve 62 may be implemented with a 3-way valve that has one inlet, a first outlet and a second outlet that are selectively opened and includes an actuator that selectively opens and closes the two outlets. In this case, the first outlet may be connected to the water discharge nozzles 210 and 220, and the second outlet may be connected to the drain pipe 50.

In detail, an inlet of the first water discharge valve 61 is connected to the second common pipe 39, a first outlet is connected to the first water discharge nozzle 210, and a second outlet is connected to the drain pipe 50.

In addition, an inlet of the second water discharge valve 62 is connected to the sterilizing water pipe 34, a first outlet is connected to the second water discharge nozzle 220, and a second outlet is connected to the drain pipe 50.

In some implementations, the drain pipe connected to the first water discharge valve 61 and the drain pipe connected to the second water discharge valve 62 may be provided separately, and one drain pipe may be used in common.

In some examples, as shown in FIG. 1, the water dispensing part 200 may be mounted to the sink 10 such that at least a portion thereof is exposed to the upper portion of the sink 10. Accordingly, the body portion 230, and the first water discharge nozzle 210 and the second water discharge nozzle 220 extending to one side of the body portion 230 may be exposed to the outside while being positioned above the sink 10.

In some cases, an apparatus may be configured such that purified water, hot water, cold water, or sterilizing water is discharged through a water discharge nozzle exposed to the outside of the sink.

In some implementations, the water discharge nozzle may be configured such that the cold, hot, or purified water and sterilizing water are discharged in one water dispensing part.

Even in a case where the water dispensing part is configured such that the purified water, cold water, hot water, and sterilizing water are discharged to the outside of the sink, when washing vegetables and fruits, or the like, the user may need to first wash bacteria and dirt on the surface of vegetables, fruits, or the like under a water discharge nozzle for sterilizing water. The user may move the vegetables, fruits or the like under a water discharge nozzle through which purified water is discharged, and then turn on the purified water to remove the sterilizing water on the vegetables and fruits through second washing. Therefore, as the first washing and the second washing are performed at different places, the washing process may be cumbersome.

In some implementations, by placing the object to be cleaned in one position, the user may perform the first washing with the sterilizing water through the second water discharge nozzle 220 and then perform washing with purified water by dispensing the purified water through the first water discharge nozzle 210 disposed above the second water discharge nozzle 220. Therefore, while the first washing and the second washing are performed in one place, making the washing process very simple.

In some cases, the water mainly used by the user may be purified water, hot water, and cold water. The sterilizing water may only be discharged in a special situation. In some examples, the first water discharge nozzle 210 may be disposed above the second water discharge nozzle 220 such that the user may select the discharge of the purified water to avoid discharge of the sterilizing water by a mistake.

In some cases, when the user drinks sterilizing water after dispensing, it may not be beneficial to the user's health if hypochlorous acid is contained in the sterilizing water.

Thus, in some implementations, the first water discharge nozzle 210 through which cold, hot, and purified water are discharged may be disposed on the upper side of the cylindrical body portion 230, and the second water discharge nozzle 220 through which sterilizing water is discharged may be disposed on the lower side thereof.

In addition, as shown in the drawing, the width and the extended length of the first water discharge nozzle 210 through which purified water, hot water, and cold water are discharged may be formed to be wider and longer than the second water discharge nozzle 220 through which the sterilizing water is discharged. Therefore, the second water discharge nozzle 220 through which the sterilizing water is discharged may be hidden by the first water discharge nozzle 210.

In some cases in related art, water discharge nozzles may be arranged up and down and rotated individually.

In some implementations, the upper water discharge nozzle and the lower water discharge nozzle may be rotated separately. In a case where the upper discharge nozzle and the lower discharge nozzle are not rotated independently but are rotated at the same time, when the purified, cold, or cold water is discharged from the upper water discharge nozzle, the lower water discharge nozzle may interfere with a container receiving water. Therefore, the two water discharge nozzles are disposed in the cylindrical body portion 230 forming the outer shape, and each configured to have a structure capable of being rotated a certain angle with respect to a cylindrical inner member 260 fixed to the sink. The first water discharge nozzle 210 and the second water discharge nozzle 220 may be designed to rotate about 180 degrees.

In addition, in the case of the present disclosure, in order to prevent the two water discharge nozzles 210 and 220 that rotate independently from moving arbitrarily by external interference, that is, to prevent the rotation that is not desired by the user from occurring, a plurality of O-rings and square rings may be mounted between a fixing body and a rotating body.

In some implementations, the 'rotating body' may refer to the first water discharge nozzle 210 and the second water discharge nozzle 220. In addition, the 'fixing body' may refer to the body portion 230, the inner member 260 to be described later, first and second connection members 214 and 215 and a coupling member 216 to be described later.

Each of the O-rings and square ring is formed of a material having elasticity. In addition, the first water discharge nozzle 210 and the second water discharge nozzle 220 may be fixed at a position set by the user by the action of the O-ring and the square ring.

In particular, in the case of O-rings, friction is formed in the circumferential direction, and in the case of the square ring, a predetermined height is formed, thereby forming friction in the vertical direction. Therefore, in the case of the first water discharge nozzle 210 and the second water discharge nozzle 220, the shaking in the circumferential direction and the vertical direction (axial direction) may be prevented by the O-ring and the angle ring. In addition, the O-ring and the angle ring may hold the play between the components. As the friction occurs by the O-ring and the square ring, while the first water discharge nozzle 210 and the second water discharge nozzle 220 rotate smoothly, the operation feeling may be improved, and the first water discharge nozzle 210 and the second water discharge nozzle 220 may be fixed to a rotated position.

In addition, the water dispensing part 200 may be provided with a display and input device 240.

For example, the display and input device 240 may be provided in a touch screen manner. The display and input device 240 may include a water dispensing button 244, an input part that allows a user to input various commands and settings, and a display that displays various states to the outside.

For example, the display and input device 240 may be provided on an upper surface of the first water discharge nozzle 210. Therefore, the display and input device 240 may be located at the top of the water dispensing part 200.

In addition, the display and input device 240 may perform a function of selecting hot water, purified water, cold water, or sterilizing water, a water dispensing command function, a function of setting and displaying cold water and hot water temperatures, a drain selection function, a filter replacement cycle notification function, a function of setting an amount of water discharged, a function of setting the dispensing time of the water discharged, or the like.

In addition, a sterilizing water selection button and a sterilizing water dispensing button are also provided on the upper side of the first water discharge nozzle 210, allowing the user to always recognize the water discharged.

The water dispensing button 244 may be disposed on the top portion of a first cock 219 to be described later. That is, the water dispensing button 244 may be formed at a position overlapping with the first cock 219 in the vertical direction.

Hereinafter, with reference to FIGS. 1 and 2, a process of dispensing purified water, cold water, hot water and sterilizing water in the water dispensing apparatus will be described.

The body portion 100 may receive source water through a source water pipe 20 connected to a water supply source such as a water pipe, a water tank, and an underground water pipe. A pressure reducing valve 21 is installed on the source water pipe 20, and a pressure of source water is reduced to a predetermined pressure while passing through the pressure reducing valve 21.

The source water with reduced pressure flows into the filter 120 through a pipe connecting the pressure reducing valve 21 and the filter 120. The source water passing through the filter 120 becomes purified water because foreign matters are removed therefrom. Then, the purified water passing through the filter 120 by opening the feed valve 35 flows through the water discharge pipe 30, and passes through the flow rate sensor 36.

In this case, the flow rate detected by the flow rate sensor 36 may be used as data necessary for output control of the hot water tank 130 or the cold water tank 140.

In some examples, the purified water passing through the flow rate sensor 36 flows along the water discharge pipe 30. The purified water may be branched to a sterilizing water side, a cold water-purified side, or a hot water side.

The purified water branched into the cold water-side and the purified water-side is again branched to the cold water-side and the purified water-side and flows into the purified water pipe 31 and the cold water pipe 32, respectively. The purified water pipe 31 and the cold water pipe 32 are respectively provided with a purified water valve 41 and a cold water valve 42 that control the flow of water. The purified water valve 41 and the cold water valve 42 may be selected by a user's operation for selecting purified water or cold water, and the valve selected by the user's operation for a dispensing button is opened so that purified water or cold water may be supplied to the user through the first water discharge nozzle 210.

In detail, when the user requests the cold water dispensing, the cold water valve 42 is opened. When the cold water valve 42 is opened as described above, the purified water of the water discharge pipe 30 passes through the cold water pipe 32 and the cold water valve 42, and the water in the cold water pipe 32 passes through a cooling coil inside the cold water tank 140. The water flowing along the cooling coil is heat-exchanged with coolant inside the cold water tank 140 and cooled to become cold water. To this end, the coolant is continuously cooled to maintain a set temperature.

The cold water passing through the cold water tank 140 may flow to the water dispensing part 200 through a first common flow path (e.g., the first common pipe 38) and a second common flow path (e.g., the second common pipe 39) connected to the cold water pipe 32 and may be supplied to the first water discharge nozzle 210 through the first water discharge valve 61.

In some implementations, a compressor may be driven to cool the coolant. The driving of the compressor may be determined by a cold water temperature sensor provided in the cold water tank 140. Thus, the coolant may always maintain the set temperature and for this purpose, the driving of the compressor may be adjusted. The compressor may be adjusted in frequency according to a load required by an inverter compressor, and the cooling capability may be adjusted. That is, the compressor may be driven by inverter control and may cool the coolant at the optimum efficiency.

In some examples, when the user requests the purified water dispensing, the purified water valve 41 is opened. When the purified water valve 41 is opened as described above, the purified water in the water discharge pipe 30 may pass through the purified water pipe 31 and the purified water valve 41, and flow to the water dispensing part 200 through the first common flow path 38 and the second common flow path 39, connected to the purified water pipe 31. Then, the purified water may be supplied to the first water discharge nozzle 210 via the first water discharge valve 61.

In some examples, when the user requests dispensing of hot water, the hot water valve 43 is opened. When the hot water valve 43 is opened as described above, the purified water of the water discharge pipe 30 passes through the hot water pipe 33 and the hot water valve 43. In addition, the water passing through the hot water pipe 33 may be adjusted in the flow rate by the flow rate control valve 37. The purified water, of which the flow rate is adjusted while passing through the flow rate control valve 37 as described above, may pass through the hot water tank 130. Then, the purified water may be heated to a set temperature when passing through the hot water tank 130. The hot water tank 130 may be heated in an induction heating method and for this purpose, the output of a working coil included in the hot water tank 130 may be adjusted.

The purified water passing through the hot water tank 130 may be heated to the set temperature.

The hot water heated while passing through the hot water tank 130 may flow to the water dispensing part 200 through the second common flow path 39 connected to the hot water pipe 33. Then, the purified water may be supplied to the first water discharge nozzle 210 through the first water discharge valve 61.

The hot water tank 130 may be further connected to a drain pipe 50. The drain pipe 50 may allow steam to be discharged to the outside when water in the hot water tank 130 boils. In addition, the drain pipe 50 is provided with a safety valve 51, so that the safety valve 51 is opened to discharge steam to the outside when a pressure higher than a predetermined pressure is generated.

In detail, the safety valve 51 is for discharging steam generated when the hot water is heated in the hot water tank, and may prevent the pressure of the inside of the hot water tank from being excessively increased. The safety valve 51 may be configured to be opened at a set pressure, and may have various structures to smoothly discharge steam in the hot water tank.

In the case of the drain pipe for discharging the steam, the drain pipe may be formed separately from the drain pipe connected to the first water discharge valve 61 and the second water discharge valve 62. In addition, in the case of the drain pipe for discharging the steam, the drain pipe may be joined to the drain pipe connected to the first water discharge valve 61 and the second water discharge valve 62.

In some implementations, the hot water tank 130 may instantaneously generate hot water in an induction heating method. In addition, when the flow rate of the incoming water introduced into the hot water tank 130 is small due to characteristics of the instantaneous heating, boiling may occur in the hot water tank 130.

In the case of the present disclosure, in order to prevent this, a temperature sensor is mounted on a heat sink of an element (e.g., insulated-gate bipolar transistor (IGBT)) included in a control module for supplying output to the hot water tank. When the temperature of the heat sink exceeds the set temperature (for example, 70° C.), supply of the output to the hot water tank 130 is stopped.

For example, the hot water tank 130 may include an induction heating assembly for making hot water and a controller that controls the driving of the induction heating assembly and the valve. The induction heating assembly and the controller may be coupled to each other in a single module, and may be mounted inside the housing 110 in a coupled state.

The induction heating assembly is for receiving the purified water supplied to the hot water tank 130 and heating the purified water to generate hot water, and may be configured to perform heating in the induction heating (IH) method. The induction heating assembly may include a walking coil for heating water passing through the hot water tank 130.

In the water dispensing apparatus as described above, cold water, purified water, and hot water may be discharged to the outside through one first water discharge nozzle 210.

In some implementations, the first water discharge valve 61 is provided with a temperature sensor that measures the temperature of cold water and hot water supplied through the second common pipe 39, and the temperature sensor may detect the temperature of cold water and hot water supplied from the second common pipe 39. In addition, when the temperature detected by the temperature sensor falls within a preset satisfaction range, the first water discharge valve 61 may supply the cold water of the hot water to the first water discharge nozzle 210, and when the detected temperature is out of the preset satisfaction range, discharge the purified water, cold water or hot water to the side of the drain pipe 50.

The temperature sensor may be installed on the flow path of the first water discharge valve 61. In detail, the temperature sensor may be installed to be exposed to the side of an inlet through which the cold/hot water is introduced.

In addition, when the hot water or cold water is discharged, when the user presses the water dispensing button, the water in the pipe may be drained unconditionally regardless of whether the temperature is satisfied, and the hot or cold water dispensing may be performed.

In detail, when the user requests the cold water dispensing, the water (residual water) filled between the cold water tank 140 and the first water discharge valve 61 is automatically drained through the drain pipe 50, and the discharge of the residual water is performed. Thereafter, the water in the cold water tank 140 may be supplied to the first water discharge nozzle 210 through the first water discharge valve 61. Thus, the cold water only may be supplied to the user.

In detail, when the user requests the hot water dispensing, the water (residual water) filled between the hot water tank 130 and the first water discharge valve 61 is automatically drained through the drain pipe 50, and the discharge of the residual water is performed. Thereafter, the water in the hot water tank 130 may be supplied to the first water discharge nozzle 210 through the first water discharge valve 61. Therefore, only the hot water may be supplied to the user.

In some examples, in the case of the purified water, dispensing of the purified water may be performed immediately without draining the residual water.

In some examples, when the user requests the sterilizing water dispensing, the sterilizing water valve 44 is opened. When the sterilizing water valve 44 is opened as described above, the purified water in the water discharge pipe 30 passes through the sterilizing water pipe 34 and the sterilizing water valve 44, and water in the sterilizing water pipe 34 may pass through the sterilizing water module 150. The sterilizing water generated by the sterilizing water module 150 flows to the water dispensing part 200 along the sterilizing water pipe 34, and is then supplied to the outside through the second water discharge nozzle 220 by passing through the second water discharge valve 62.

Due to the nature of an under-sink water purifier, a distance between the body portion 100 installed inside the sink and the water dispensing part 200 installed outside the sink may be long, and the flow path connecting them may be also long. In addition, since the residual water remaining in the flow path affects the temperature of water discharged, the valves 61 and 62 are installed at positions as close as possible to the water dispensing part 200 to selectively drain the residual water remaining in the flow path and then perform water dispensing, leading to satisfaction in the temperature performance.

That is, after draining the residual water remaining in the long flow path connecting the body portion 100 and the water dispensing part 200 through the valve 61 installed directly below the water dispensing part 200, only water (hot water or purified water) which is just produced may be discharged to the water discharge nozzle 210 thereby satisfying a target temperature for water discharged.

Figure 3:
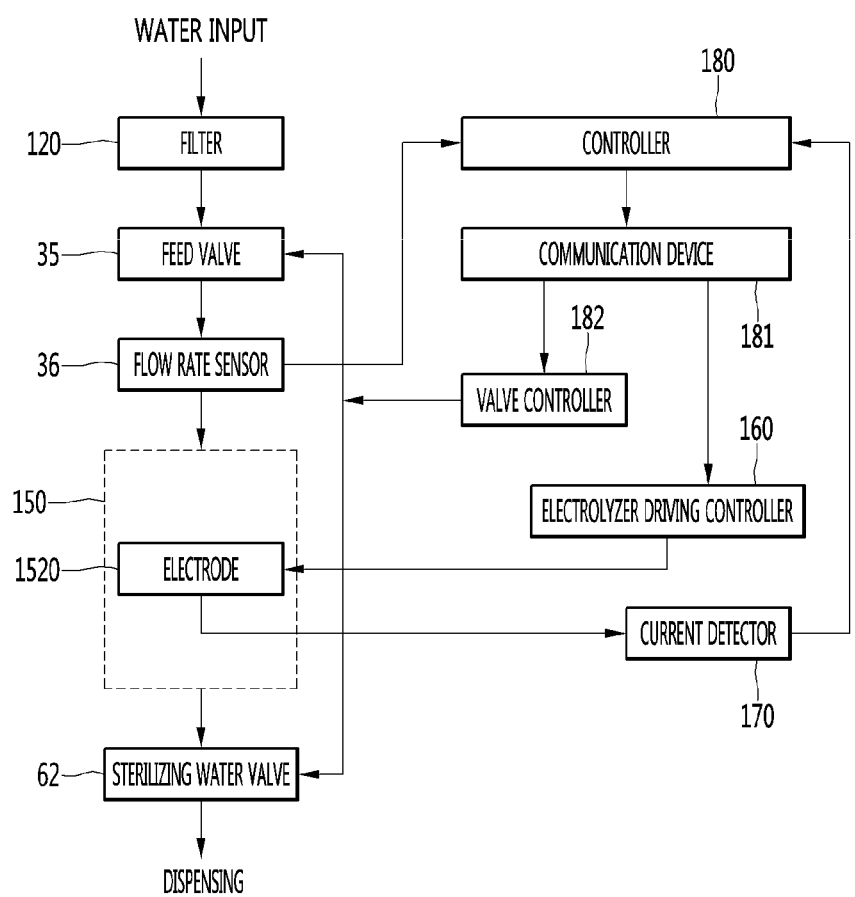
FIG. 3 is a block diagram showing example components of a water dispensing apparatus.

FIG. 3 is a block diagram showing a main configuration of the present disclosure.

Referring to FIG. 3, water introduced into the source water pipe 20 is purified to become purified water while passing through the filter 120.

The purified water passing through the filter 120 flows along the water discharge pipe 30 and passes through the feed valve 35 and the flow rate sensor 36.

Then, the water discharge pipe 30 is branched to the sterilization water pipe 34.

The sterilizing water module 150 is installed on the sterilization water pipe 34.

In addition, the water dispensing apparatus of the present disclosure may include a power supply 160 that applies a voltage to an electrodes 1520 of the sterilizing water module 150.

In addition, in a state where a voltage is applied to the electrodes 1521 and 1522 of the sterilizing water module 150, the water dispensing apparatus may include a current detector 170 that detects a real-time current value output from the electrodes 1521 and 1522, and a controller 180 that sets a target current value output from the sterilizing water module 150 based on at least one selected among the flow rate information detected by the flow rate sensor 36 and a real-time current value detected by the current detector 170.

When the sterilizing water dispensing is started, the flow rate sensor 36 may detect the real-time flow rate introduced into the sterilizing water module 150. The real-time flow rate value detected by the flow rate sensor 36 is input to the controller 180.

In addition, the power supply 160 may supply a predetermined constant voltage to the electrode 1520 of the sterilizing water module 150.

In addition, the real-time current value output from the electrode 1520 is read by the current detector 170, and the read current value is input to the controller 180.

The controller 180 may receive the real-time current value detected by the current detector 170 and the real-time flow rate value detected by the flow rate sensor 36, and set a value matching the current value and the flow rate value, which are input, as a target current.

The controller 180 has stored a table (see FIG. 12) in which a real-time current value detected by the current detector 170 is mapped to a target current value for each real-time flow rate value detected by the flow rate sensor 36.

For example, the controller 180 may set a value matching the real-time current value detected by the current detector 170 as a target current value.

In detail, the controller 180 may set a value matching the current value detected by the current detector 170 as a target current in a state in which a constant voltage is applied to the electrode 1520 of the sterilizing water module 150 by the power supply 160.

The controller 180 may predict the hardness of introduced water detected by the current detector 170, that is, the concentration of the total dissolved solids (TDS) of the introduced water based on the real-time current value detected by the current detector 170, decrease the target current value when the hardness of the water is high, and increase the target current value when the hardness of water is low.

In addition, the controller 180 may receive a real-time flow rate value detected by the flow rate sensor 36 and set a value matching the input flow rate value as a target current value.

The controller 180 may increase the target current value of the sterilizing water module 150 when the flow rate detected by the flow rate sensor 36 becomes larger, and decrease the target current value of the sterilizing water module 150 when the flow rate detected by the flow rate sensor 36 becomes smaller.

In addition, the controller 180 may transmit a signal to the power supply 160 to increase or decrease a voltage to be applied to the sterilizing water module 150 such that the real-time current value output from the sterilizing water module 150 reaches a target current value.

In detail, when the real-time current value is less than the target current value, the power supply 160 may increase the voltage to be applied to the sterilizing water module 150.

In some examples, when the real-time current value is greater than the target current value, the power supply 160 may decrease the voltage to be applied to the sterilizing water module 150.

For example, the power supply 160 may increase or decrease the voltage to be applied to the sterilizing water module 150 through duty control.

In detail, when the real-time current value is less than the target current value, the power supply 160 may increase a duty to increase the voltage to be applied to the sterilizing water module 150.

In some examples, when the real-time current value is greater than the target current value, the power supply 160 may decrease a duty to increase the voltage to be applied to the sterilizing water module 150.

In summary, in the case of generating sterilizing water, the flow rate is first checked and a constant voltage is applied to the electrodes of the sterilizing water module.

Thereafter, based on the real-time current value output from the electrode of the sterilizing water module, the concentration of total dissolved solids (TDS) of the introduced water is predicted.

The controller may set the target current value based on the detected real-time flow rate value, the real-time current value output from the electrode, and the concentration of total dissolved solids (TDS) of the introduced water.

Here, the 'target current value' may refer to a current value to be output from the electrode of the sterilizing water module.

Then, the voltage applied to the electrode may be adjusted in real time such that the current value output from the electrode of the sterilizing water module reaches the target current value.

When the flow rate of incoming water and the concentration of the total dissolved solids (TDS) of introduced water are changed, the flow control of the voltage applied to the electrode of the sterilizing water module is made accordingly, so that the sterilizing water having a uniform concentration may be generated.

The controller 180 may communicate with the valve controller 182 and the power supply 160 through the communication device 181.

The valve controller 182 may control on/off of various valves 35 and 62.

Figure 4:
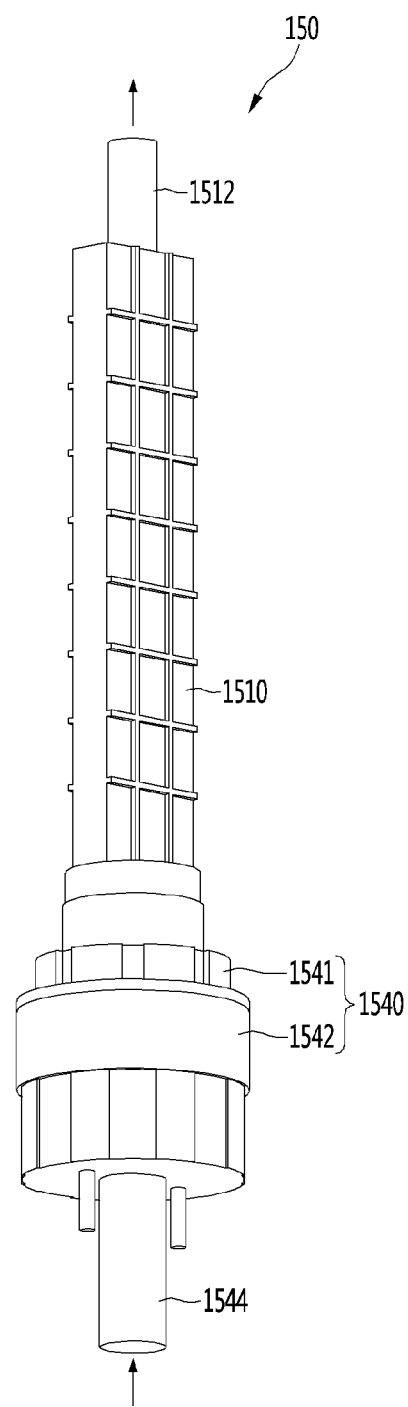
FIG. 4 is a perspective view showing an example of a sterilizing water module.
Figure 5:
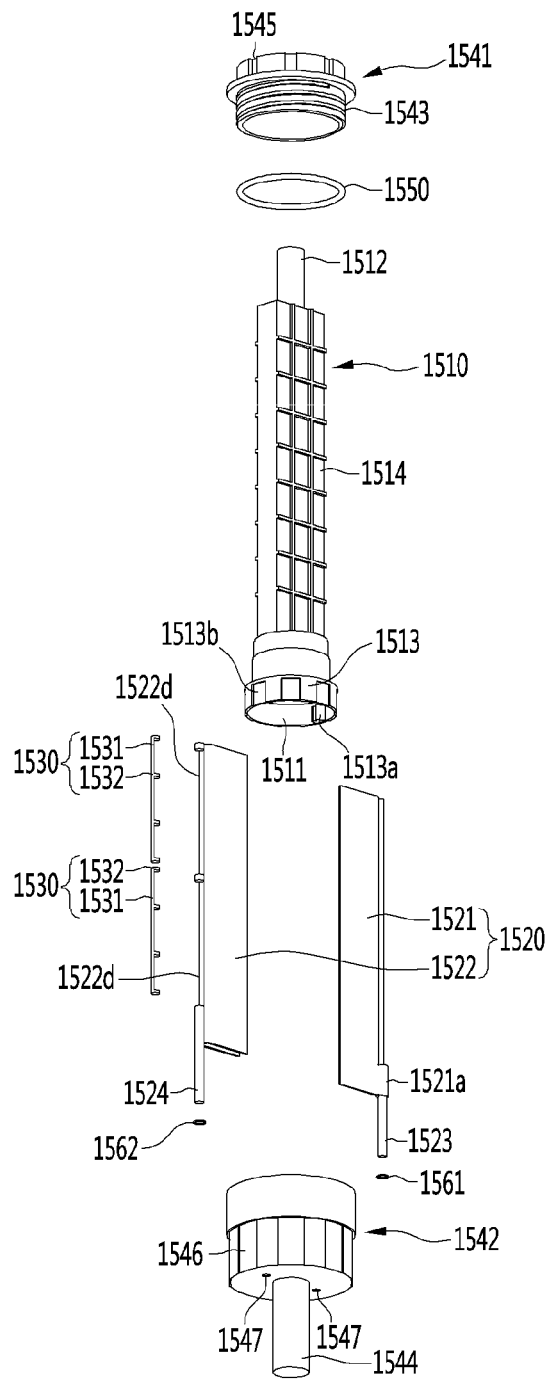
FIG. 5 is an exploded perspective view showing an example of a sterilizing water module.
Figure 6:
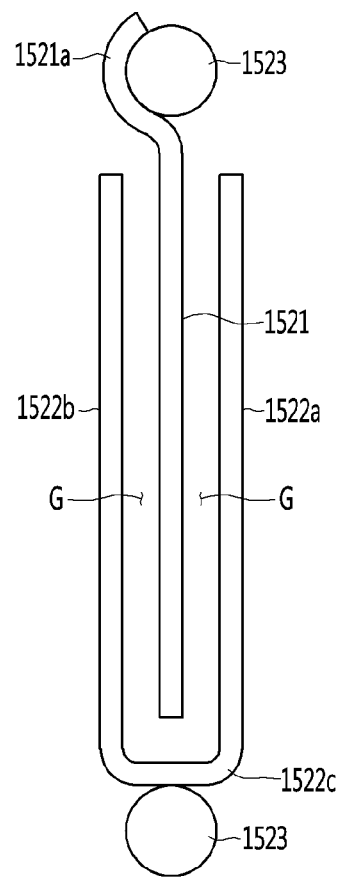
FIG. 6 is a view showing an example of a cross section of an electrode portion included in a sterilizing water generating module.

FIG. 4 is a perspective view of a sterilizing water module which is a component of the present disclosure. FIG. 5 is an exploded perspective view of a sterilizing water module which is a component of the present disclosure. FIG. 6 is a view showing a cross section of an electrode portion included in a sterilizing water generating module.

Referring to FIGS. 4 to 6, a sterilizing water module 150 may include a casing 1510, an electrode portion 1520, a spacer 1530, and a cap 1540.

The casing 1510 may define an outer body of the sterilizing water module 150.

A space for accommodating the electrode portion 1520 and the spacer 1530 is formed inside the casing 1510. One side of the casing 1510 is opened to form an opening 1511, and the other side of the casing 1510 is formed with a discharge tube 1512 through which sterilizing water is discharged. The casing 1510 may have a box shape of which at least part is flat. The casing 1510 may have a box shape of which at least a part has a long length.

The thickness or width of the inner space defined by the casing 1510 may maintain a constant size along the longitudinal direction such that a water pressure or a flow rate is constant during inlet and outlet of water. That is, the inner space of the casing 1510 may have the same cross-sectional area in the flow direction of water.

In addition, the opening 1511 and the discharge tube 1512 may also have the same cross-sectional area in the flow direction of water.

The opening 1511 of the casing 1510 may be shielded by a cap 1540. For example, a cylindrical inlet portion 1513 may be formed at one end of the casing 1510 having the opening 1511, and the cap 1540 may also be formed in a cylindrical shape. The cap 1540 may be coupled to the casing 1510 so as to surround the inlet portion 1513 of the casing 1510 in which the opening 1511 is formed. The inlet portion 1513 may have a step shape of which an outer diameter gradually increases in stepwise from the upper side to the lower side. A plurality of grooves 1513b may be formed in an outer circumferential surface of an end of the inlet portion 1513.

In some examples, the cap 1540 may be composed of an upper cap 1541 and a lower cap 1542.

The upper cap 1541 may have a hollow shape such that at least a portion of the casing 1510 may pass therethrough.

The upper cap 1541 may be fitted downward from the upper side (based on FIG. 5) in which the discharge tube 1512 of the casing 1510 is formed. In addition, the upper cap 1541 may be seated on the upper side of the inlet portion 1513 in a shape of surrounding the inlet portion 1513.

The lower cap 1542 is fastened to the upper cap 1541 while shielding the opening 1511 from the lower side of the casing 1510. As an example, a thread 1543 may be formed on an outer circumferential surface of the lower portion of the upper cap 1541. In addition, a thread to which the thread 1543 of the upper cap 1541 is fastened may be formed on the inner circumferential surface of the upper end of the lower cap 1542.

When the upper cap 1541 and the lower cap 1542 are fastened as described above, the opening 1511 of the casing 1510 may be shielded by the cap 2540.

In addition, an O-ring 1550 for sealing may be inserted between the upper cap 1541 and the lower cap 1542 or between the casing 1510 and the cap 1540.

The lower cap 1542 may be formed with an inlet tube 1544 through which purified water supplied from the sterilizing water pipe 34 is introduced. The inlet tube 1544 may be connected to the sterilizing water pipe on the side of a filter, and the discharge tube 1512 may be connected to the sterilizing water pipe on the side of the water outlet (e.g., water dispensing part 200).

In addition, the outer surface of the upper cap 1541, and the outer surface of the lower cap 1542 anti-slip unevenness portions 1545 and 1546 may be respectively formed to prevent slip of the user's hand. Grooves and protrusions may be alternately formed in the circumferential direction to form the anti-slip unevenness portions 1545 and 1546 on the outer surface of the upper cap 1541 and the outer surface of the lower cap 1542.

In addition, the casing 1510 may include a plurality of reinforcing ribs 1514 integrally formed in an outer surface thereof.

The casing 1510 may have flat surfaces facing each other. The plurality of reinforcing ribs 1514 provided on the outer surface of the casing 1510 having a planar shape may include a plurality of transverse reinforcing ribs and a plurality of longitudinal reinforcing rib. The plurality of longitudinal reinforcement ribs and the plurality of transverse reinforcement ribs may cross each other to form a grid pattern.

With the configuration of the plurality of reinforcing ribs 1514 as described above, the pressure resistance performance of the casing 1510 may be further improved.

In some examples, the outer surface of the sterilizing water module 150 is formed by the casing 1510 and the cap 1540 as described above.

The sterilizing water module 150 may be disposed such that the inlet tube 1544 faces downward and the discharge tube 1512 faces upward. Accordingly, water introduced through the inlet tube 1544 may flow upward from the lower side of the inside of the casing 1510. The discharge tube 1512 may be located above the casing 1510, and the sterilizing water may be discharged to the outside of the casing 1510 through the discharge tube 1512.

The inlet tube 1544 and the discharge tube 1512 are connected to the sterilizing water pipe 34 individually. Therefore, the purified water introduced into the sterilizing water pipe 34 is introduced into the sterilizing water module 150 through the inlet tube 1544, and the sterilizing water generated by the sterilizing water module 150 is discharged from the sterilizing water module 150 through the discharge tube 1512. After being discharged from the sterilizing water module 150, the sterilizing water may be supplied to the water dispensing part 200 through the sterilizing water pipe 34.

As described above, when the inlet tube 1544 through which the purified water is introduced is positioned on the lower side, and the discharge tube 1512 through which the sterilizing water the is discharged is positioned on the upper side, water slowly flows from the lower side to the upper side, and bubbles generated in the process of generating the sterilizing water are collected at the upper side and then exit the discharge tube 1512.

When the inlet tube 1544 is positioned above the casing 1510, the water introduced through the inlet tube 1544 quickly flows downward by gravity, and the purified water may not sufficiently react with the electrode portion 1520 and be discharged. As a result, it is difficult to secure a desired sterilizing water concentration.

In some cases, when the inlet tube 1544 and the discharge tube 1512 are arranged in the horizontal direction, the bubbles generated during the generation of the sterilizing water may not smoothly discharged, which may lower the generation efficiency of sterilizing water.

In order to prevent such a problem, the inlet tube 1544 and the discharge tube 1512 are disposed in the vertical direction. The sterilizing water module 150 may be installed such that the inlet tube 1544 is disposed on the lower side and the discharge tube 1512 is disposed on the upper side.

As a result, the contact area between the water and the electrode portion 1520 is expanded while the water level gradually increases from the lower side to increase generation efficiency of the sterilizing water due to the chemical reaction between the electrode portion 1520 and the water.

A flow path through which water flows along the longitudinal direction of the casing 1510 is formed inside the casing 1510.

Two electrode portions 1520 may be disposed to overlap each other in the casing 1510. In addition, a spacer 1530 may be provided in the casing 1510 to maintain a distance between the two electrode portions 1520.

The electrode portion 1520 may include a first electrode 1521 and a second electrode 1522. The casing 1510 may be provided with one or more holders for holding at least a portion of the first electrode 1521 and the second electrode 1522 to be fixed in an inner surface thereof.

For example, the first electrode 1521 and the second electrode 1522 may be provided in a plate shape.

As another example, the first electrode 1521 may have a plate shape, and the second electrode 1522 may have a shape in which one side and the other side are folded to face each other. The second electrode 1522 may have a cross section of a "U" shape.

The second electrode 1522 may include a pair of electrode plates 1522a and 1522b facing each other and a bent portion 1522c connecting one sides of the electrode plates 1522a and 1522b.

At least one slit 1522d that is cut may be formed in the bent portion 1522c.

The first electrode 1521 may be disposed between electrode plates 1522a and 1522b.

The electrode plates 1522a and 1522b and the first electrode 1521 are disposed in parallel to each other and are spaced apart from each other. That is, a gap G is formed between the electrode plates 1522a and 1522b and the first electrode 1521.

In addition, in order to maintain the gap G formed between the electrode plates 1522a and 1522b and the first electrode 1521 as described above, a spacer 1530 is inserted between the electrode plates 1522a and 1522b and the first electrode 1521 or between the electrode plates 1522a and 1522b.

The spacer 1530 may be provided in plural. The spacer 1530 may be inserted into the slit 1522d. For example, two slits 1522d that are spaced apart from each other in the longitudinal direction may be provided, and two spacers 1530 may be provided corresponding to the slits 1522d.

The spacer 1530 has a central portion 1531 formed in parallel with the longitudinal direction of the electrode 1520 and a plurality of protrusions formed to be thicker than the central portion 1531 and spaced apart from each other in the longitudinal direction of the central portion 1531.

For example, the protrusion 1532 may be fitted between the electrode plates 1522a and 1522b to maintain a distance between the electrode plates 1522a and 1522b.

As another example, the protrusion 1532 may be fitted between the electrode plates 1522a and 1522b and the first electrode 1521 to maintain the distance between the electrode plates 1522a and 1522b and the first electrode 1521.

As described above, when the spacer 1530 is formed of the central portion 1531 and the protrusion 1532, water may flow through the space between the protrusions 1532 while the distance between the electrodes 1521 and 1522 is maintained, thus leading to reduction in the flow resistance of water.

In some examples, terminal portions 1523 and 1524 may include the first electrode 1521 and the second electrode 1522, respectively. The first electrode 1521 may protrude so as to surround at least a portion of the terminal portion 1523, and a grip portion 1521a that is curved may be formed therein.

The terminal portions 1523 and 1524 may be exposed to the outside through the lower cap 1542. The terminal portions 1523 and 1524 may be formed to be parallel to each other.

An inlet portion 1513 of the casing 1510 may include a fitting portion 1513a, to which the terminal portions 1523 and 1524 are fixed, that is disposed at an inner surface thereof. In addition, through holes 1547 through which the terminal portions 1523 and 1524 pass may be formed in the lower cap 1542. In some examples, each of O-rings 1561 and 1562 may be inserted between one of the through holes 1547 and one of the terminal portions 1523 and 1524 to prevent leakage.

In some implementations, the first electrode 1521 and the second electrode 1522 may be supplied with power from the outside through the terminal portions 1523 and 1524 exposed to the outside of the lower cap 1542, and may electrolyze water (purified water) in which chlorine ions are dissolved to produce hypochlorous acid water having sterilizing power. The hypochlorous acid water contains a large amount of bubbles, and is discharged in a milky state. Therefore, the user may visually check the sterilizing water containing a lot of bubbles, and may distinguish the purified water and the sterilizing water. In this case, the concentration of the sterilizing water may be set in a range where a problem does not occur when the user drinks it.

In addition, the first electrode 1521 and the second electrode 1522 are disposed to face each other on both sides of a solid polymer electrolyte membrane, and induce an electrolysis reaction in water to generate a high concentration of ozone, thereby producing sterilizing water containing ozone having a strong sterilizing power.

As described above, two electrodes 1521 and 1522 are respectively provided with the terminal portions 1523 and 1524, and an external power (current) may be applied to the electrodes 1521 and 1522 through the terminal portions 1523 and 1524. The terminal portions 1523 and 1524 may respectively protrude in the same direction from one side of the electrodes 1521 and 1522, and may extend to protrude outward through the lower cap 1542. In addition, each of the terminal portions 1523 and 1524 may be spaced apart from each other in the transverse direction (width direction) of the electrodes 1521 and 1522.

As described above, when the electrode portion 1520 is provided with the first electrode 1521 with a plate shape and the second electrode 1522 of a folded shape, the size of the electrode portion 1520 may be reduced and as a result, the size of the sterilizing water module 150 may be reduced.

In some examples, since the second electrode 1522 has a folded shape and the first electrode 1521 is disposed between the electrode plates 1522*a* and 1522*b* of the second electrode 1522, the contact area between the water and the electrodes 1521 and 1522 may be improved, and the chemical reaction between the electrodes 1521 and 1522 and water may be efficiently increased.

In some implementations, surfaces of the first electrode 1521 and the second electrode 1522 which face each other may be coated to form coating layers. For example, the first electrode 1521 and the second electrode 1522 may be formed of a titanium (Ti) material. The coating layer may be formed of a mixture of iridium (Ir) and platinum (Pt). The first electrode 1521 and the second electrode 1522 may have a thickness of 0.5 mm, and the coating layers may have a thickness of 1.6 µm. The coating layer may be formed on both surfaces of the first electrode 1521. The coating layer may be formed on inner surfaces of the second electrode 1522 facing each other.

In the sterilizing water module 150 as described above, the generated sterilizing water is provided to the sink through the second water discharge nozzle 220, and the user may wash dishes or fruits using the sterilizing water.

FIGS. 7A to 7D are views showing an example of an assembly process of a sterilizing water generating module.

Referring to FIGS. 7A to 7D, a second spacer 1560 may be inserted between the electrode plates 1522*a* and 1522*b* and the first electrode 1521 or between the electrode plates 1522*a* and 1522*b*.

Figure 7A:
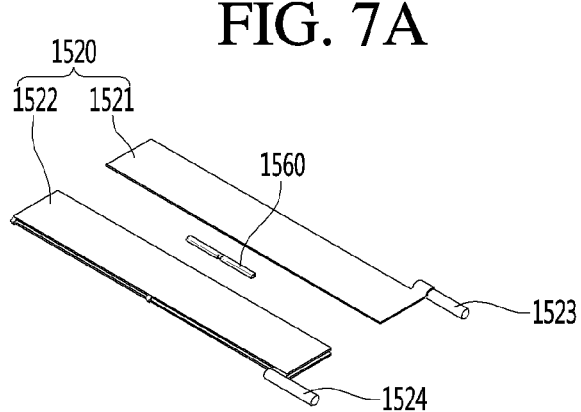
FIGS. 7A-7D are views showing an example of an assembly process of a sterilizing water generating module.

Referring to FIG. 7A, the second spacer 1560 may be formed in a single body. The second spacer 1560 may form the cross section of a 'C' shape.

The second spacer 1560 may have a slit groove formed on one side thereof in a longitudinal direction, and an end of the first electrode 1521 may be inserted into the slit groove.

The second spacer 1560 may form a fixing groove in the center of the other side.

A bridge 1522*f* formed between the slits 1522*d* of the second electrode 1522 is inserted into the fixing groove.

Then, both ends of the first electrode 1521 on both sides of the fixing groove are inserted into the slit 1522*d*.

Figure 7B:
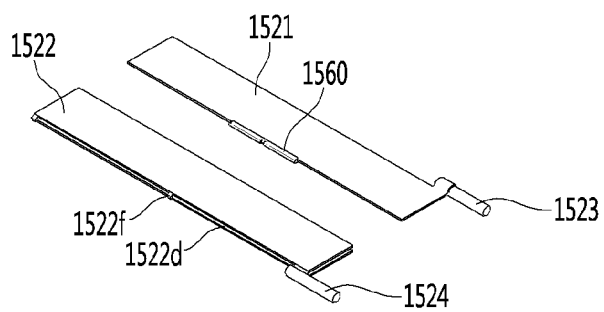

Referring to FIG. 7B, the second spacer 1560 may be coupled to the first electrode 1521.

In some examples, an end of the first electrode 1521 is inserted into a slit groove defined a first side of the second spacer 1560. The second spacer 1560 is coupled to the central portion of the first electrode 1521.

Figure 7C:
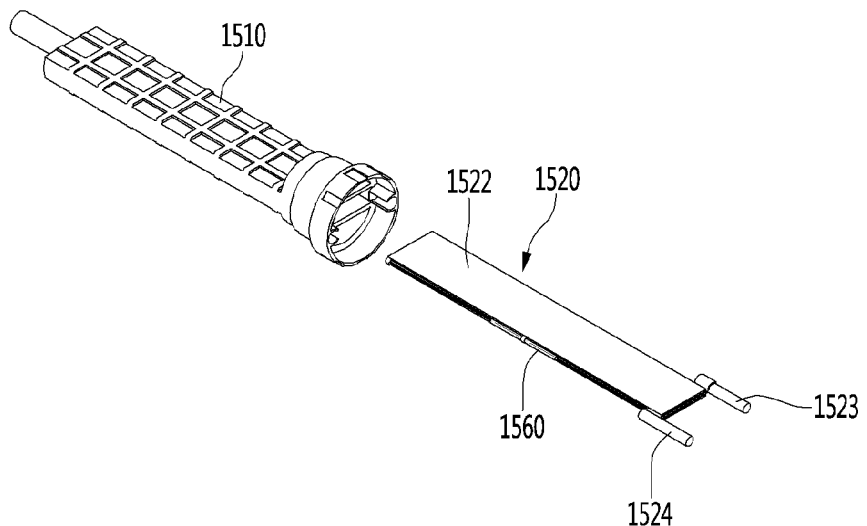

Thereafter, as shown in FIG. 7C, when the first electrode 1521 is inserted into the second electrode 1522, the first electrode 1521 and the second electrode 1522 are coupled to each other.

In some examples, a second side of the second spacer 1560 is inserted into the slit 1522*d*, and the bridge 1522*f* disposed in the slit 1522*d* is inserted into a fixing groove defined in the central portion of the second side of the second spacer 1560.

As described above, in a case in which the bridge 1522*f* is inserted into the fixing groove, when the electrode 1520 is inserted into the casing 1510, the second spacer 1560 may be fixed without being pushed or separated.

Figure 7D:
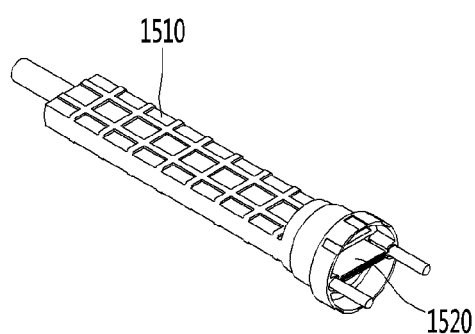

Thereafter, as illustrated in FIG. 7D, the electrode 1520 coupled in integral manner is inserted into the casing 1510.

A control method for the water dispensing apparatus, an input step of receiving a sterilizing water dispensing command from a user, a flow rate detection step of detecting a flow rate of water introduced into a sterilization water module that generates sterilization water through electrolysis, a constant voltage supply step of applying a constant voltage to an electrodes of the sterilizing water module, a current detection step of detecting a real-time current value output from the electrode of the sterilizing water module, and a setting step of setting a target current value output from the sterilizing water module based on at least one of the detected flow rate and the real-time current value.

The control method may further include, after setting the target current value in the setting step, an adjustment step of comparing the real-time current value and the target current value, and changing a voltage to be applied to the electrode of the sterilizing water module.

The adjustment step may include increasing the voltage to be applied to the electrode of the sterilizing water module when the real-time current value is lower than the target current value, and decreasing the voltage to be applied to the electrode of the sterilizing water module when the real-time current value is greater than the target current value.

Further, in the setting step, the voltage to be applied to an electrode of the sterilizing water module may be increased or decreased through duty control.

In addition, in the setting step, when the real-time current value is low, it is determined that the hardness of water is low and the target current value may be increased, and when the real-time current value is high, it is determined that the hardness of water is high and the target current value may be decreased.

In addition, in the setting step, when the real-time current value is detected, the real-time current value may be set to the target current value which is previously matched with the current value.

Further, in the setting step, as the larger the real-time flow rate, the target current value may be increased, and as the smaller the real-time flow rate, the target current value may be decreased.

Figure 8:
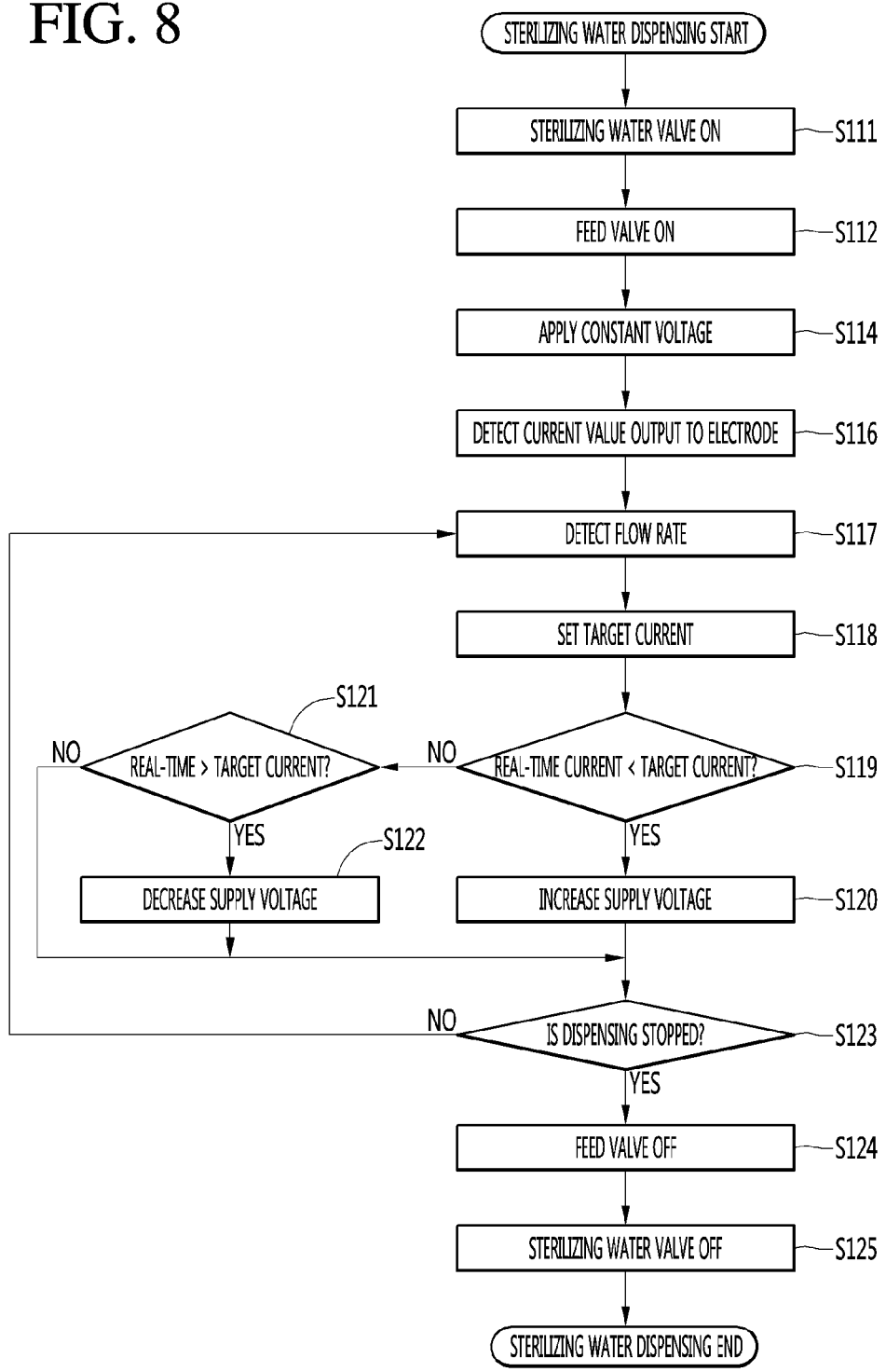
FIG. 8 is a flowchart showing an example of a control method for a water dispensing apparatus.

FIG. 8 is a flowchart showing an example of a control method for a water dispensing apparatus.

In some implementations, a control method for the water dispensing apparatus includes an input step of receiving an N-th sterilizing water dispensing command from a user, a determination step of determining a desired dispensing amount, a comparison step of comparing the desired dispensing amount with a reference value, a flow rate detection step of detecting a flow rate of water introduced into a sterilization water module that generates sterilization water through electrolysis when the desired dispensing amount is less than the reference value, and a setting step of setting a target current value output from the sterilizing water module based on the detected flow rate.

In addition, in the setting step, the target current value may be set to a current value output by the sterilizing water module in case of (N–1)-th sterilizing water dispensing.

In addition, the control method may further include, when the desired dispensing amount is greater than the reference value, a constant voltage supply step of applying a constant voltage to an electrodes of the sterilizing water module, a current detection step of detecting a real-time current value output from the electrode of the sterilizing water module, and a setting step of setting a target current value output from the sterilizing water module based on the detected flow rate and the real-time current value.

In addition, the control method may further include, after setting the target current value in the setting step, an adjustment step of comparing the real-time current value and the target current value, and changing a voltage to be applied to the electrode of the sterilizing water module.

Figure 9:
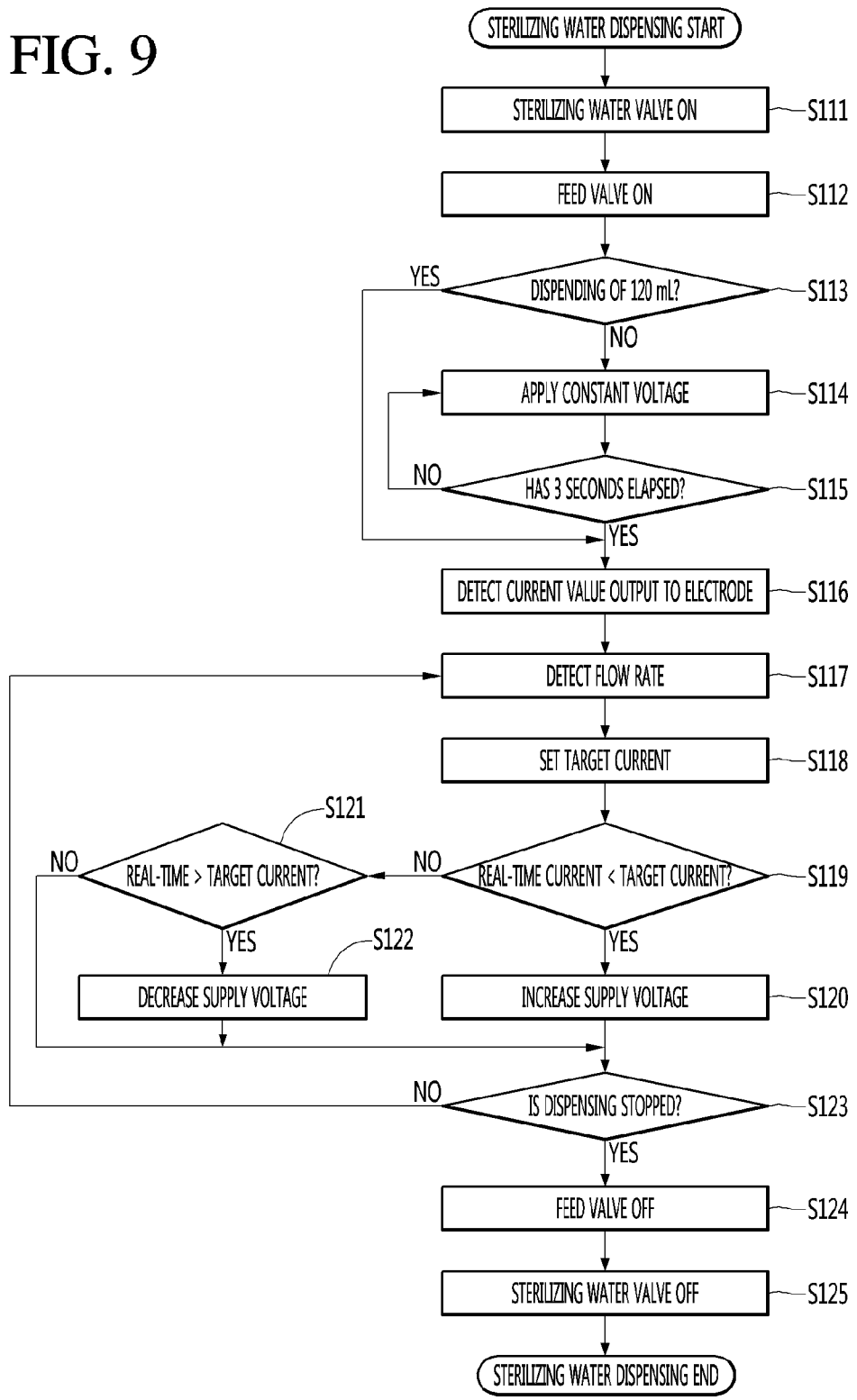
FIG. 9 is a flowchart showing an example of a control method for a water dispensing apparatus.

FIG. 9 is a flowchart illustrating an example of a control method for a water dispensing apparatus.

Hereinafter, a control method for a water dispensing apparatus will be described with reference to FIG. 9.

First, an N-th sterilizing water dispensing command is input from the user.

Then, a sterilizing water valve is opened. (S111)

The 'sterilizing water valve' refers to the second water discharge valve 62.

In addition, the feed valve 35 is opened (S112).

When the sterilizing water dispensing command is input from the user, the controller 180 may transmit an opening signal to a valve controller 182 through a communication device 181 to open the sterilizing water valve and the feed valve 35.

Thereafter, the amount of water discharged is compared with a reference flow rate (S113).

As an example, the reference flow rate may be set to 120 ml.

In step S113, when the amount of water discharged (desired discharge water amount) is larger than the reference flow rate, a power supply 160 may apply a predetermined constant voltage to the electrode 1520 of the sterilizing water module 150 (S114).

For example, the constant voltage may be set to 5V to 9V.

When a sterilizing water dispensing command is input from the user, the controller 180 may transmit a signal to the power supply 160 to apply a constant voltage to the electrode 1520 of the sterilizing water module 150.

Then, it is determined whether a time for which the constant voltage is applied to the electrode 1520 of the sterilizing water module 150 has exceeded a reference time (S115).

For example, the reference time may be set to about 3 seconds.

In step S115, when the time for which the constant voltage is applied to the electrode 1520 of the sterilizing water module 150 has exceeded the reference time, a current detector 170 may detect a current value output by the electrode 1520 of the sterilizing water module 150 in real time (S116).

The current value detected by the current detector 170 may be input to the controller 180.

In the step S116, when water is introduced into the sterilizing water module 150, energization is made, so that a current flows from the first electrode to the second electrode, and the current output from the second electrode is read by the current detector 170.

In this case, the higher the concentration of total dissolved solids (TDS) of the introduced water, the greater the current value output from the second electrode.

Therefore, when the current value output from the second electrode is large, the controller may determine that the concentration of total dissolved solids (TDS) of the introduced water is high. That is, it may be determined that the hardness of the introduced water is high.

In this case, since the hardness of the introduced water is high, the controller 180 may decrease the magnitude of a voltage applied to the electrode 1520 of the sterilizing water module 150 such that the concentration of the sterilizing water generated by the sterilizing water module 150 is not too high.

In addition, when the current value output from the second electrode is small, the controller may determine that the concentration of total dissolved solids (TDS) of the introduced water is low. That is, it may be determined that the hardness of the introduced water is low.

In this case, since the hardness of the introduced water is low, the controller 180 may increase the voltage applied to the electrode 1520 of the sterilizing water module 150 to secure the concentration of the sterilizing water generated by the sterilizing water module 150.

In some implementations, when the concentration of the sterilizing water is lower than a reference, the sterilizing power is not secured, and when the concentration of the sterilizing water is larger than the reference, there is a problem that chlorine odor is caused.

In some examples, in step S113, when the amount of water discharged (desired amount of discharged water) is less than a reference flow rate, the steps S114 and S115 are omitted.

Then, step S117 to be described later is performed immediately.

When the flow rate of the sterilizing water discharged is small, the discharge time is short because the amount of discharged water is small.

Therefore, when step S114 and S115 are performed to cause time consumption for the steps, there occurs a problem that it difficult to secure the concentration of the sterilizing water.

Therefore, when the flow rate of the sterilizing water discharged is small, steps S114 and S115 are omitted, and step S117 of detecting the flow rate is immediately performed.

That is, when the flow rate of the sterilizing water discharged is small, the control of determining the concentration of total dissolved solids (TDS) of the introduced water and changing the magnitude of a voltage to be applied to the electrode 1520 accordingly is omitted. Only the control of changing the magnitude of the voltage to be applied to the electrode 1520 according to the flow rate is performed.

In some examples, the flow rate sensor 36 may detect the real-time flow rate of the water introduced into the sterilizing water module 150 (S117).

The detected flow rate may be input to the controller 180.

In this case, when the detected flow rate is large, the controller 180 may increase the voltage applied to the electrode 1520 of the sterilizing water module 150 to secure the concentration of the sterilizing water generated by the sterilizing water module 150.

In some examples, when the detected flow rate is small, the controller 180 may decrease the magnitude of a voltage applied to the electrode 1520 of the sterilizing water module 150 such that the concentration of the sterilizing water generated by the sterilizing water module 150 is not too high.

As described above, when a current value output from the electrode and the real-time flow rate value are input to the controller 180 after the constant voltage is applied, the controller 180 may set a target current (S118).

Here, the target current may refer to a target value of the current output from the electrode 1520 of the sterilizing water module 150.

The controller 180 has stored a table (see FIG. 12) in which a real-time current value detected by the current detector 170 is mapped to a target current value for each real-time flow rate value detected by the flow rate sensor 36.

Therefore, the controller 180 may set a target current value as soon as the current value output from the electrode and the real-time flow rate value are input after the constant voltage is applied.

In some examples, when the flow rate of the sterilizing water to be discharged is set small and S114 and S115 are omitted, the target current (N-th) is equal to the target current value ((N-1)-th) in the case of (N-1)-th sterilizing water dispensing. In some examples, (N-1)-th sterilizing water dispensing may refer to a previous sterilizing water dispensing event that occurred before the N-th sterilizing water dispensing even.

As described above, in a state where the target current value is set, the current detector 170 may continuously detect the current value output from the electrode 1520 of the sterilizing water module 150.

In addition, the controller 180 may compare the current value detected by the current detector 170 with the target current value set in step S118 (S119).

When the real-time current is less than the target current in step S119, the controller 180 may transmit a signal to the power supply 160 to increase a voltage to be supplied to the electrode 1520 of the sterilizing water module 150. (S120)

On the contrary, when the real-time current is not less than the target current in step S119, it is determined whether the real-time current is greater than the target current (S121).

When the real-time current is greater than the target current in step S121, the controller 180 may transmit a signal to the power supply 160 to decrease the voltage to be supplied to the electrode 1520 of the sterilizing water module 150. (S122)

In some examples, when the real-time current is not greater than the target current in step S121, the controller 180 may maintain the voltage to be supplied to the electrode 1520 of the sterilizing water module 150 without increasing or decreasing the voltage.

In addition, the controller 180 may determine whether to stop water dispensing (S123).

In some implementations, when a set amount of sterilizing water is all discharged or when an emergency water dispensing stop command is input from the user, water dispensing is stopped.

In step S123, when it is determined that it is necessary to stop water dispensing, the controller 180 may close the feed valve 35 (S124).

Then, the sterilizing water valve is closed (S125).

The 'sterilizing water valve' refers to the second water discharge valve 62.

The controller 180 may transmit a cutoff signal to the valve controller 182 through the communication device 181 to block the sterilizing water valve and the feed valve 35 for stop of water dispensing.

The sterilizing water dispensing is finished.

In some examples, when it is determined in step S123 that it is not necessary to stop water dispensing, the flow returns to step S117 of checking the flow rate, sets a target current according to the flow rate, and supplies the current to the electrode so that the current output from the electrode reaches the set target current. The step of controlling the voltage may be repeated.

FIG. 10 is a table comparing current values output from the sterilizing water module according to the flow rate and hardness of water introduced into the sterilizing water module in a state where a constant voltage is applied to the electrode of the sterilizing water module.

Figure 11:
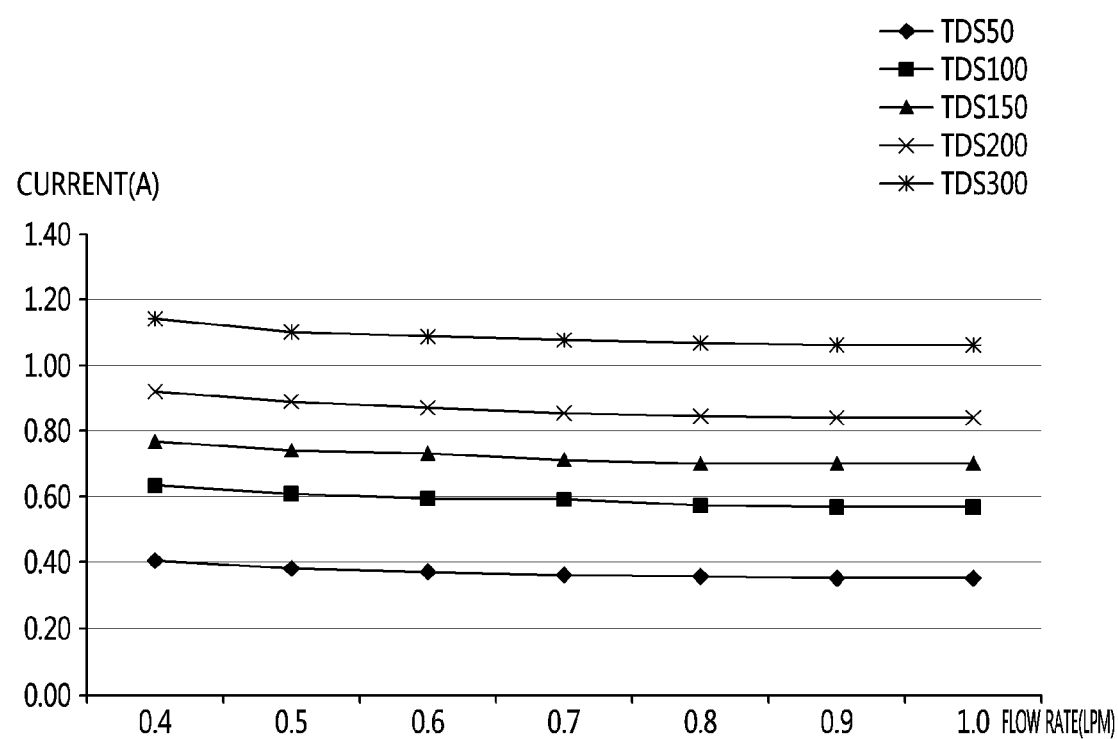
FIG. 11 is a graph showing the current values output from the sterilizing water module according to the flow rate and hardness of water flowing into the sterilizing water module when the constant voltage is applied to the electrode of the sterilizing water module.

FIG. 11 is a table comparing current values output from the sterilizing water module according to the flow rate and hardness of water introduced into the sterilizing water module in a state where a constant voltage is applied to the electrode of the sterilizing water module.

Referring to FIGS. 10 to 11, it can be seen that, in the state in which a constant voltage is applied to the electrode of the sterilizing water module, the larger the flow rate of the water introduced into the sterilizing water module, the smaller the current value output from the sterilizing water module, and the greater the hardness of the water introduced into the sterilizing water module, the larger the current value output from the sterilizing water module.

Therefore, in a state where the flow rate is fixed and the constant voltage is applied, it is possible to predict the hardness of the introduced water, that is, the concentration of total dissolved solids (TDS) of the introduced water based on the current value output from the sterilizing water module and therefore, even when the flow rate or hardness of the incoming water are changed, it is possible to generate and provide a sterilizing water having a uniform concentration by adjusting the magnitude of the voltage to be applied to the electrode accordingly.

FIG. 12 shows a table in which the flow rate of water introduced into the sterilizing water module is mapped to a target current value output from the sterilizing water module for each hardness.

Figure 13:
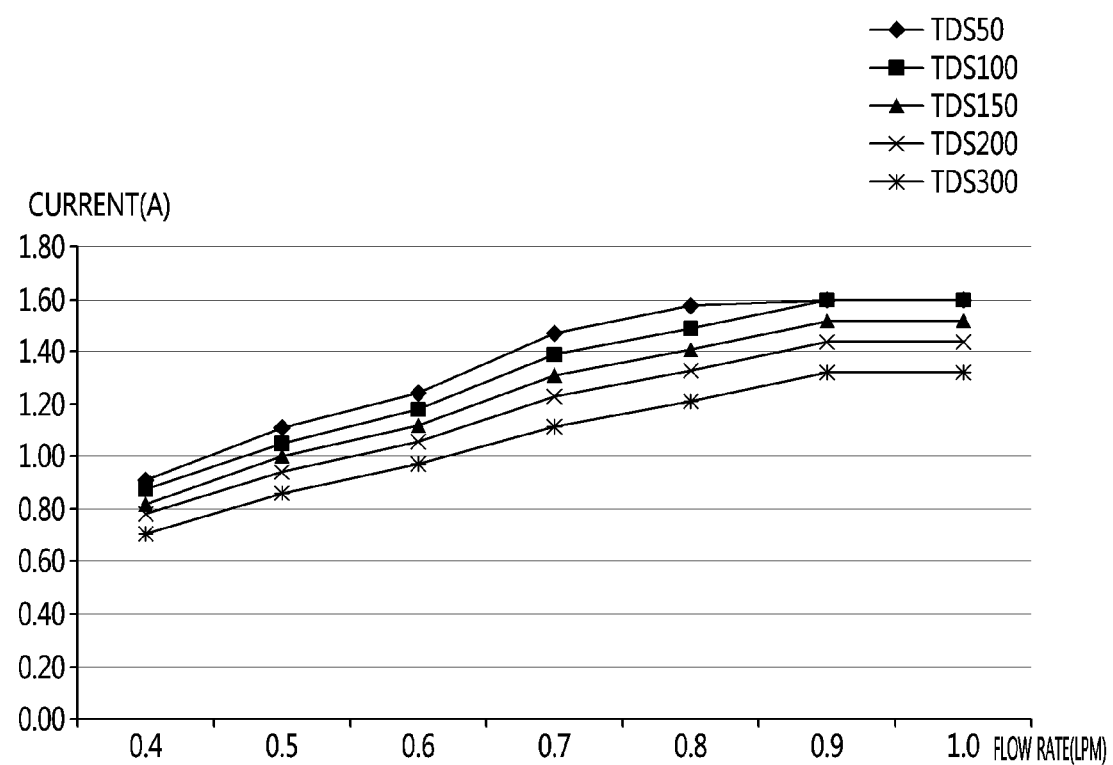
FIG. 13 is a graph showing the target current values output from the sterilizing water module by the flow rate and hardness of water flowing into the sterilizing water module.

FIG. 13 shows a graph in which the flow rate of water introduced into the sterilizing water module is mapped to a target current value output from the sterilizing water module for each hardness.

Referring to FIGS. 12 to 13, in the state where a constant voltage is applied to the electrode of the sterilizing water module, the larger the current value output from the sterilizing water module, that is, the hardness of the introduced water or the total dissolved solid material of the introduced water (TDS) As the concentration of dissolved solids increases, the target current value decreases, and the lower the flow rate of water flowing into the sterilizing water module, the smaller the target current value becomes.

On the contrary, when a constant voltage is applied to the electrode of the sterilization module, the smaller the current value output from the sterilization module, that is, the hardness of the introduced water or the concentration of the total dissolved solids (TDS) The lower the target current value is, the larger the flow rate of water flowing into the sterilizing water module, the higher the target current value can be confirmed.

As described above, according to the present invention, Therefore, in a state where the flow rate is fixed and the constant voltage is applied, it is possible to predict the hardness of the introduced water, that is, the concentration of total dissolved solids (TDS) of the introduced water based on the current value output from the sterilizing water module and therefore, even when the flow rate or hardness of the incoming water are changed, it is possible to generate and provide a sterilizing water having a uniform concentration by adjusting the magnitude of the voltage to be applied to the electrode accordingly.

In addition, even if the flow rate flowing into the sterilizing water module is changed, it is possible to adjust the magnitude of the voltage applied to the electrode accordingly, to generate and provide a sterilizing water of a uniform concentration.

What is claimed is:

1. A water dispensing apparatus comprising:
   a source water pipe configured to receive water;
   a filter configured to generate purified water by filtering the water supplied through the source water pipe;
   a first water discharge nozzle configured to discharge the purified water that has passed through the filter;
   a sterilizing water module configured to receive the purified water that has passed through the filter and to generate sterilizing water from the received purified water;
   a sterilizing water pipe connected to the sterilizing water module and configured to provide the sterilizing water generated by the sterilizing water module to a user;
   a second water discharge nozzle disposed below the first water discharge nozzle and connected to the sterilizing water pipe, the second water discharge nozzle being configured to discharge the sterilizing water;
   a flow rate sensor disposed at the source water pipe;
   a power supply configured to apply a voltage to an electrode of the sterilizing water module;
   a current detector connected to the electrode of the sterilizing water module and configured to detect a current value output from the electrode of the sterilizing water module based on the voltage being applied to the electrode of the sterilizing water module; and
   a controller configured to set a target current value of the sterilizing water module and to change the target current value based on flow rate information detected by the flow rate sensor and the current value detected by the current detector,
   wherein the controller is configured to:
      based on a constant voltage being applied from the power supply to the electrode of the sterilizing water module, set a value associated with the current value as the target current value,
      predict a hardness of introduced water based on the current value detected by the current detector,
      decrease the target current value based on the hardness of the introduced water being greater than a reference hardness, and
      increase the target current value based on the hardness of the introduced water being less than or equal to the reference hardness.

2. The water dispensing apparatus of claim 1, wherein the controller is configured to increase or decrease the voltage applied to the sterilizing water module to thereby control the current value to the target current value.

3. The water dispensing apparatus of claim 1, wherein the controller is configured to:
   increase the target current value based on an increase of a flow rate detected by the flow rate sensor; and
   decrease the target current value based on a decrease of the flow rate.

4. The water dispensing apparatus of claim 1, wherein the filter is disposed at the source water pipe, and
   wherein the water dispensing apparatus further comprises a feed valve disposed at the source water pipe and configured to control flow of water in the source water pipe.

5. The water dispensing apparatus of claim 1, wherein the sterilizing water pipe comprises a sterilizing water valve configured to control flow of sterilizing water in the sterilizing water pipe.

6. The water dispensing apparatus of claim 1, wherein the sterilizing water module comprises:
   an inlet tube disposed at a first side of the sterilizing water module and configured to receive water from the source water pipe;
   a casing that defines an inner space extending parallel to the inlet tube and being configured to guide the water received through the inlet tube;
   an electrode portion that extends parallel to a longitudinal direction of the casing, that is disposed in the inner space of the casing, and that is configured to generate sterilizing water through electrolysis of water; and
   a discharge tube that extends parallel to the inlet tube, that is disposed at a second side of the sterilizing water module opposite to the inlet tube, and that is configured to discharge water passing through the inner space of the casing.

7. The water dispensing apparatus of claim 6, wherein the electrode portion comprises:
   a first electrode; and
   a second electrode that faces the first electrode, that is spaced apart from the first electrode, and that extends parallel to the first electrode.

8. The water dispensing apparatus of claim 6, wherein at least a part of the casing has an elongated flat box shape, and
   wherein the inner space corresponding to the part of the casing defines one cross-sectional area along a flow direction of water in the casing.

9. The water dispensing apparatus of claim 1, wherein the controller is configured to:
- store a data table that matches a plurality of target values with a plurality of current values, respectively;
- identify one of the plurality of target values that matches the current value detected by the current detector; and
- determine the one of the plurality of target values as the target current value.

* * * * *